US009065488B2

(12) United States Patent
Kim et al.

(10) Patent No.: US 9,065,488 B2
(45) Date of Patent: Jun. 23, 2015

(54) METHOD AND APPARATUS FOR DATA COMMUNICATION IN WIRELESS POWER TRANSMISSION

(75) Inventors: Dong Zo Kim, Yongin-si (KR); Sang Wook Kwon, Seongnam-si (KR); Ki Young Kim, Yongin-si (KR); Nam Yun Kim, Seoul (KR); Yun Kwon Park, Dongducheon-si (KR); Eun Seok Park, Yongin-si (KR); Young Ho Ryu, Yongin-si (KR); Young Tack Hong, Seongnam-si (KR); Jin Sung Choi, Gimpo-si (KR); Chang Wook Yoon, Seoul (KR); Jong Won Yu, Daejeon (KR); Wang Sang Lee, Daejeon (KR); Hyeong Seok Jang, Daejeon (KR)

(73) Assignees: Samsung Electronics Co., Ltd., Suwon-si (KR); Korea Advanced Institute of Science and Technology, Daejeon (KR)

( * ) Notice: Subject to any disclaimer, the term of this patent is extended or adjusted under 35 U.S.C. 154(b) by 211 days.

(21) Appl. No.: 13/558,492

(22) Filed: Jul. 26, 2012

(65) Prior Publication Data

US 2013/0130621 A1    May 23, 2013

(30) Foreign Application Priority Data

Nov. 17, 2011    (KR) .................. 10-2011-0120416

(51) Int. Cl.
*H04B 7/24*    (2006.01)
*H04B 5/00*    (2006.01)

(52) U.S. Cl.
CPC ............ *H04B 5/0031* (2013.01); *H04B 5/0037* (2013.01)

(58) Field of Classification Search
CPC ....................................... H04B 5/0075
USPC .......................... 455/39, 41.1, 41.2
See application file for complete search history.

(56) References Cited

U.S. PATENT DOCUMENTS

| 7,359,341 B2 * | 4/2008 | Okamoto et al. ............. 370/310 |
| 8,633,615 B2 * | 1/2014 | Lee et al. ...................... 307/104 |
| 2010/0127660 A1 | 5/2010 | Cook et al. |
| 2010/0243737 A1 * | 9/2010 | Kargl et al. .................... 235/439 |
| 2011/0028091 A1 * | 2/2011 | Higgins et al. ............... 455/41.2 |

(Continued)

FOREIGN PATENT DOCUMENTS

| JP | 2008-295242 A | 12/2008 |
| JP | 2010-63245 A | 3/2010 |

(Continued)

OTHER PUBLICATIONS

International Search Report issued Dec. 18, 2012 in counterpart International Application No. PCT/KR2012/005340 (3 pages).

(Continued)

*Primary Examiner* — Tuan H Nguyen
(74) *Attorney, Agent, or Firm* — NSIP Law

(57) ABSTRACT

A method and apparatus for data communication in wireless power transmission are provided. A wireless power transmitter includes a resonance antenna configured to wirelessly transmit a power to a wireless power receiver, and receive a signal from the wireless power receiver, the signal including a sub-carrier. The wireless power transmitter further includes a controller configured to receive the signal from the resonance antenna, and receive data from the wireless power receiver based on the sub-carrier.

19 Claims, 16 Drawing Sheets

(56) References Cited

U.S. PATENT DOCUMENTS

2011/0053500 A1* 3/2011 Menegoli et al. ............ 455/41.1
2011/0211646 A1* 9/2011 Mashino et al. ............. 375/260

FOREIGN PATENT DOCUMENTS

| KR | 10-1998-0064799 A | 10/1998 |
| --- | --- | --- |
| KR | 10-2009-0023540 A | 3/2009 |
| KR | 10-2010-0066339 A | 6/2010 |
| KR | 10-1006187 B1 | 1/2011 |

OTHER PUBLICATIONS

Written Opinion issued Dec. 18, 2012 in counterpart International Application No. PCT/KR2012/005340 (4 pages).

* cited by examiner

METHOD AND APPARATUS FOR DATA COMMUNICATION IN WIRELESS POWER TRANSMISSION

CROSS-REFERENCE TO RELATED APPLICATION(S)

This application claims the benefit under 35 U.S.C. §119(a) of Korean Patent Application No. 10-2011-0120416, filed on Nov. 17, 2011, in the Korean Intellectual Property Office, the entire disclosure of which is incorporated herein by reference for all purposes.

BACKGROUND

1. Field

The following description relates to a method and apparatus for data communication in wireless power transmission.

2. Description of Related Art

A wireless power refers to energy transferred from a wireless power transmitter to a wireless power receiver through magnetic coupling. Accordingly, a wireless power transmission and charging system includes a source device and a target device. The source device wirelessly transmits a power, and the target device wirelessly receives the power. The source device may be referred to as a wireless power transmitter, and the target device may be referred to as a wireless power receiver.

The source device includes a source resonator, and the target device includes a target resonator. Magnetic coupling or resonance coupling is formed between the source resonator and the target resonator.

A single source device may transmit power to a plurality of target devices. When the plurality of target devices simultaneously approach a source resonator of the source device, or the plurality of target devices exist within a range of the source resonator, and when a power is supplied to the source device, data collision may occur due to the plurality of target devices during an operation for initial connection with the source device. Accordingly, a charging operation of the plurality of target devices may not be performed.

SUMMARY

In one general aspect, there is provided a wireless power transmitter including a resonance antenna configured to wirelessly transmit a power to a wireless power receiver, and receive a signal from the wireless power receiver, the signal including a sub-carrier. The wireless power transmitter further includes a controller configured to receive the signal from the resonance antenna, and receive data from the wireless power receiver based on the sub-carrier.

The data includes in-band communication data for in-band communication between the wireless power transmitter and the wireless power receiver.

The controller is further configured to detect an envelope of the sub-carrier, the envelope including logical values '1' and '0'. The controller is further configured to receive the data from the wireless power receiver based on the logical values '1' and '0'.

The controller is further configured to detect another wireless power receiver. The controller is further configured to allocate, to the other wireless power receiver, a non-allocated sub-carrier among sub-carriers.

The controller is further configured to detect another wireless power receiver. The controller is further configured to allocate, to the other wireless power receiver, an allocated sub-carrier among sub-carriers, and a time slot.

The controller is further configured to transmit data to the resonance antenna. The resonance antenna is further configured to transmit the data to the wireless power receiver using the sub-carrier.

The controller is further configured to increase and reduce a number of sub-carriers allocated to the wireless power receiver based on an environment of the wireless power transmitter and the wireless power receiver. The controller is further configured to adjust allocation of the sub-carriers to the wireless power receiver based on the number of the sub-carriers.

The wireless power transmitter further includes a detector configured to receive the signal from the resonance antenna, and remove a main carrier from the signal to demodulate the signal. The wireless power transmitter further includes a band-pass filter unit configured to extract the sub-carrier from the demodulated signal.

The band-pass filter unit includes a band-pass filter configured to extract the sub-carrier from the demodulated signal through filtering.

The sub-carrier includes a time slot. The controller is further configured to receive the data from the wireless power receiver based on the sub-carrier and the time slot.

In another general aspect, there is provided a wireless power receiver including a resonance antenna configured to wirelessly receive a power from a wireless power transmitter. The wireless power receiver further includes a controller configured to generate a communication signal including data to be transmitted to the wireless power transmitter. The wireless power receiver further includes a load modulator configured to receive the communication signal from the controller, and modulate a load of the wireless power receiver to generate an output signal based on the communication signal, the output signal including a sub-carrier allocated to the wireless power receiver. The resonance antenna is further configured to receive the output signal from the load modulator, and transmit the output signal to the wireless power transmitter using the sub-carrier.

The resonance antenna is further configured to receive a power and data (power/data) signal from the wireless power transmitter. The wireless power receiver further includes a detector configured to receive the power/data signal from the resonance antenna and remove a main carrier from the power/data signal to demodulate the power/data signal. The wireless power receiver further includes a band-pass filter unit configured to extract another sub-carrier allocated to the wireless power receiver from the demodulated power/data signal. The controller is further configured to detect an envelope of the other sub-carrier, the envelope including logical values '1' and '0', and recognize data from the wireless power transmitter based on the logical values '1' and '0'.

The band-pass filter unit includes a band-pass filter, configured to extract the other sub-carrier.

The sub-carrier includes a time slot allocated to the wireless power receiver. The resonance antenna is further configured to transmit the output signal to the wireless power transmitter using the sub-carrier and the time slot.

In still another general aspect, there is provided a data communication method including detecting a wireless power receiver. The method further includes allocating, to the wireless power receiver, a frequency channel among frequency channels. The method further includes transmitting a power to the wireless power receiver. The method further includes performing data communication with the wireless power receiver using the frequency channel.

The method further includes determining whether the wireless power receiver is completely charged based on the data communication. The method further includes recovering the frequency channel when the wireless power receiver is completely charged. The method further includes interrupting the transmitting of the power to the wireless power receiver when the wireless power receiver is completely charged.

The method further includes detecting another wireless power receiver. The method further includes determining whether all of the frequency channels are allocated. The method further includes allocating, to the other wireless power receiver, a non-allocated frequency channel among the frequency channels if all of the frequency channels are not allocated.

The method further includes distributing, to the other wireless power receiver, an allocated frequency channel among the frequency channels based on a time-division of the frequency channel if all of the frequency channels are allocated.

A non-transitory computer-readable storage medium stores a program including instructions to cause a computer to implement the method.

In yet another general aspect, there is provided a data transmission method including generating a communication signal including data to be transmitted to a wireless power transmitter. The method further includes generating an output signal based on the communication signal, the output signal including a sub-carrier allocated to a wireless power receiver. The method further includes transmitting the output signal to the wireless power transmitter using the sub-carrier.

Other features and aspects may be apparent from the following detailed description, the drawings, and the claims.

Figure 1:
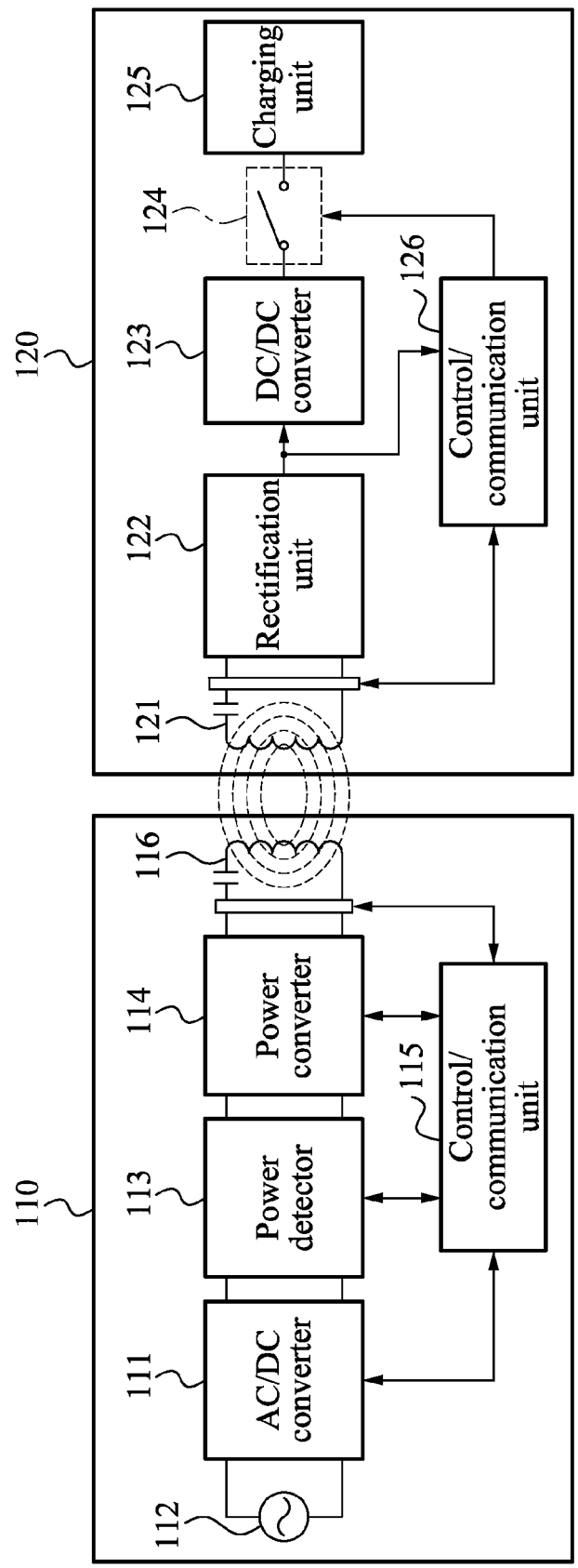
FIG. 1 is a diagram illustrating an example of a wireless power transmission and charging system.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, description of well-known functions and constructions may be omitted for increased clarity and conciseness.

FIG. 1 illustrates an example of a wireless power transmission and charging system. The wireless power transmission and charging system includes a source device 110 and a target device 120.

The source device 110 includes an alternating current-to-direct current (AC/DC) converter 111, a power supply 112, a power detector 113, a power converter 114, a control and communication (control/communication) unit 115, and a source resonator 116. The target device 120 includes a target resonator 121, a rectification unit 122, a DC-to-DC (DC/DC) converter 123, a switch unit 124, a charging unit 125, and a control/communication unit 126.

The AC/DC converter 111 rectifies an AC voltage in a band of tens of hertz (Hz) output from the power supply 112 to generate a DC voltage. The AC/DC converter 111 may output the DC voltage of a predetermined level, or may adjust an output level of the DC voltage based on a control of the control/communication unit 115.

The power detector 113 detects an output current and an output voltage of the AC/DC converter 111, and transfers, to the control/communication unit 115, information on the detected current and the detected voltage. Additionally, the power detector 113 may detect an input current and an input voltage of the power converter 114.

The power converter 114 converts the DC voltage to an AC voltage to generate a power, using a switching pulse signal in a band of a few kilohertz (KHz) to tens of megahertz (MHz). For example, the power converter 114 may convert the DC voltage supplied to a power amplifier (PA) to the AC voltage, using a reference resonance frequency $F_{Ref}$, to generate a communication power used for communication and/or a charging power used to charge. The communication power and/or the charging power may be used in target devices. The communication power may refer to a low power of 0.1 milliwatt (mW) to 1 mW, and the charging power may refer to a high power of 1 mW to 200 W that is consumed in a device load of a target device.

The term "charging" may refer to supplying a power to a unit or element configured to charge power. Additionally, the term "charging" may refer to supplying power to a unit or element configured to consume power. The units or elements may include, for example, batteries, displays, sound output circuits, main processors, and various sensors. The term "reference resonance frequency" may refer to a resonance frequency used by the source device 110. Additionally, the term "tracking frequency" may refer to a resonance frequency adjusted by a preset scheme.

The control/communication unit 115 detects a reflected wave of the communication power and/or the charging power, and detects mismatching between the target resonator 121 and the source resonator 116 based on the detected reflected wave. To detect the mismatching, the control/communication unit 115 may detect an envelope of the reflected wave, and/or detect a power amount of the reflected wave. The control/communication unit 115 may compute a voltage standing wave ratio (VSWR) based on a voltage level of the reflected wave and a level of an output voltage of the source resonator 116 or the power converter 114. For example, when the VSWR is less than a predetermined value, the control/communication unit 115 may determine that the mismatching is detected. In this example, the control/communication unit 115 may compute a power transmission efficiency for each of N tracking frequencies set in advance, may determine a tracking frequency $F_{Best}$ with the best power transmission efficiency among the N tracking frequencies, and may adjust the reference resonance frequency $F_{Ref}$ to the tracking frequency $F_{Best}$.

Additionally, the control/communication unit 115 controls a frequency of a switching pulse signal. Under the control of the control/communication unit 115, the frequency of the switching pulse signal is determined. By controlling the power converter 114, the control/communication unit 115 generates a modulation signal to be transmitted to the target device 120. For example, the control/communication unit 115 may transmit various messages to the target device 120 using in-band communication. Additionally, the control/communication unit 115 detects a reflected wave, and demodulates a signal received from the target device 120 through an envelope of the detected reflected wave.

The control/communication unit 115 may generate a modulation signal for the in-band communication, using various methods. For example, to generate the modulation signal, the control/communication unit 115 may turn on and off the switching pulse signal, and/or may perform delta-sigma modulation. Additionally, the control/communication unit 115 may generate a pulse-width modulation (PWM) signal with a predetermined envelope.

The control/communication unit 115 may also perform out-band communication employing a communication channel. The control/communication unit 115 may include a communication module, such as, for example, one configured to process ZigBee, Bluetooth, Wi-Fi, and/or WiMAX communications and/or other types of communications. The control/communication unit 115 may transmit and receive data to and from the target device 120 through the out-band communication.

The source resonator 116 transfers an electromagnetic energy to the target resonator 121. For example, the source resonator 116 may transfer, to the target device 120, the communication power and/or the charging power using the magnetic coupling with the target resonator 121.

The target resonator 121 receives the electromagnetic energy from the source resonator 116. For example, the target resonator 121 may receive, from the source device 110, the communication power and/or charging power using the magnetic coupling with the source resonator 116. Additionally, the target resonator 121 may receive various messages from the source device 110 using the in-band communication.

The rectification unit 122 rectifies an AC voltage to generate a DC voltage. The AC voltage is received from the target resonator 121.

The DC/DC converter 123 adjusts a level of the DC voltage output from the rectification unit 122 based on a capacitance of the charging unit 125. For example, the DC/DC converter 123 may adjust the level of the DC voltage to be within a range of about 3 volt (V) to about 10 V.

The switch unit 124 is turned on and off under the control of the control/communication unit 126. When the switch unit 124 is turned off, the control/communication unit 115 of the source device 110 detects a reflected wave. In other words, when the switch unit 124 is turned off, the magnetic coupling between the source resonator 116 and the target resonator 121 is eliminated.

The charging unit 125 may include a battery. The charging unit 125 may charge the battery using the DC voltage output from the DC/DC converter 123.

The control/communication unit 126 may perform in-band communication to transmit and receive data using a resonance frequency. During the in-band communication, the control/communication unit 126 may detect a signal between the target resonator 121 and the rectification unit 122, or detect an output signal of the rectification unit 122, and demodulate the detected signal. In other words, the control/communication unit 126 may demodulate a message received through the in-band communication. Additionally, the control/communication unit 126 may adjust an impedance of the target resonator 121 to modulate a signal to be transmitted to the source device 110. For example, the control/communication unit 126 may turn on and off the switch unit 124 to modulate the signal to be transmitted to the source device 110. In another example, the control/communication unit 126 may increase the impedance of the target resonator 121 so that the control/communication unit 115 of the source device 110 may detect a reflected wave. Depending on whether the reflected wave is detected, the control/communication unit 115 may detect a binary number "0" or "1".

The control/communication unit 126 transmits a response message to the source device 110. The response message may include, for example, a type of the target device 120, information on a manufacturer of the target device 120, a model name of the target device 120, a battery type of the target device 120, a scheme of charging the target device 120, an impedance value of a load of the target device 120, information on characteristics of the target resonator 121 of the target device 120, information on a frequency band used by the target device 120, an amount of a power consumed by the target device 120, an identifier (ID) of the target device 120, and/or information on a version or standard of the target device 120.

The control/communication unit 126 may also perform out-band communication employing a communication channel. The control/communication unit 126 may include a communication module, such as, for example, one configured to process ZigBee, Bluetooth, Wi-Fi, and/or WiMAX communications and/or other types of communications. The control/communication unit 126 may transmit and receive data to and from the source device 110 through the out-band communication.

The control/communication unit 126 receives a wake-up request message from the source device 110, detects an amount of a power received at the target resonator 121, and transmits, to the source device 110, information on the detected amount of the power. The information on the detected amount of the power may include, for example, an input voltage value and an input current value of the rectification unit 122, an output voltage value and an output current value of the rectification unit 122, an output voltage value and an output current value of the DC/DC converter 123, and/or other types of voltage and current values.

The control/communication unit 115 of the source device 110 sets a resonance bandwidth of the source resonator 116. Based on the setting of the resonance bandwidth of the source resonator 116, a Q-factor of the source resonator 116 may be determined.

Additionally, the control/communication unit 126 of the target device 120 sets a resonance bandwidth of the target resonator 121. Based on the setting of the resonance bandwidth of the target resonator 121, a Q-factor of the target resonator 121 may be determined.

The resonance bandwidth of the source resonator 116 may be set to be wider or narrower than the resonance bandwidth of the target resonator 121. The source device 110 and the target device 120 communicate with each other to share information on the resonance bandwidth of the source resonator 116 and the resonance bandwidth of the target resonator 121. In an example in which a power required by the target device 120 is higher than a reference value, the Q-factor of the source resonator 116 may be set to a value greater than "100". In another example in which the power required by the target device 120 is lower than the reference value, the Q-factor of the source resonator 116 may be set to a value less than "100".

In a wireless power transmission employing a resonance scheme, a resonance bandwidth is an important factor. For example, a Q-factor Qt considers all of a change in a distance between the source resonator 116 and the target resonator 121, a change in a resonance impedance, impedance mismatching, a reflected signal, and other factors. The Q-factor Qt may include an inverse-proportional relationship with the resonance bandwidth, as given in Equation 1.

$$\frac{\Delta f}{f_0} = \frac{1}{Qt}$$ [Equation 1]

$$= \Gamma_{S,D} + \frac{1}{BW_S} + \frac{1}{BW_D}$$

In Equation 1, $f_0$ denotes a central frequency, $\Delta f$ denotes a change in a bandwidth, $\Gamma_{S,D}$ denotes a reflection loss between the source resonator 116 and the target resonator 121, $BW_S$ denotes the resonance bandwidth of the source resonator 116, and $BW_D$ denotes the resonance bandwidth of the target resonator 121.

An efficiency U of the wireless power transmission may be defined, as given in Equation 2.

$$U = \frac{\kappa}{\sqrt{\Gamma_S \Gamma_D}} = \frac{\omega_0 M}{\sqrt{R_S R_D}} = \frac{\sqrt{Q_S Q_D}}{Q_\kappa}$$ [Equation 2]

In Equation 2, $\kappa$ denotes a coupling coefficient of energy coupling between the source resonator 116 and the target resonator 121, $\Gamma_S$ denotes a reflection coefficient in the source resonator 116, $\Gamma_D$ denotes a reflection coefficient in the target resonator 121, $\omega_0$ denotes a resonance frequency, M denotes a mutual inductance between the source resonator 116 and the target resonator 121, $R_S$ denotes an impedance of the source resonator 116, $R_D$ denotes an impedance of the target resonator 121, $Q_S$ denotes the Q-factor of the source resonator 116, $Q_D$ denotes the Q-factor of the target resonator 121, and $Q_\kappa$ denotes a Q-factor of the energy coupling between the source resonator 116 and the target resonator 121.

Referring to Equation 2, the Q-factors are highly relevant to the efficiency U of the wireless power transmission. Accordingly, to increase the efficiency U of the wireless power transmission, the Q-factors may be set to relatively high values. For example, when the Q-factors $Q_S$ and $Q_D$ are set to relatively high values, the efficiency U of the wireless power transmission may be reduced due to a change in the coupling coefficient $\kappa$, the change in the distance between the source resonator 116 and the target resonator 121, the change in the resonance impedance, impedance mismatching, and/or other factors.

Additionally, to increase the efficiency U of the wireless power transmission, the resonance bandwidth $BW_S$ of the source resonator 116, and the resonance bandwidth $BW_D$ of the target resonator 121 may be set to be relatively narrow. However, impedance mismatching and/or other problems may occur even due to a relatively small external effect. Considering the impedance mismatching, Equation 1 may be represented as given in Equation 3.

$$\frac{\Delta f}{f_0} = \frac{\sqrt{VSWR}-1}{Qt\sqrt{VSWR}}$$ [Equation 3]

In an example in which an unbalanced relationship of a resonance bandwidth or a bandwidth of an impedance matching frequency between the source resonator 116 and the target resonator 121 is maintained, the efficiency U of the wireless power transmission may be prevented from being reduced due to the change in the coupling coefficient $\kappa$, the change in the distance between the source resonator 116 and the target resonator 121, the change in the resonance impedance, the impedance mismatching, and/or other factors. When the unbalanced relationship of the resonance bandwidth or the bandwidth of the impedance matching frequency between the source resonator 116 and the target resonator 121 is maintained, based on Equations 1 and 3, an unbalanced relationship between the Q-factors $Q_S$ and $Q_D$ may also be maintained.

Hereinafter, the term "resonator" in FIGS. 2A through 4B may include, for example, a source resonator and/or a target resonator.

Figure 2A:
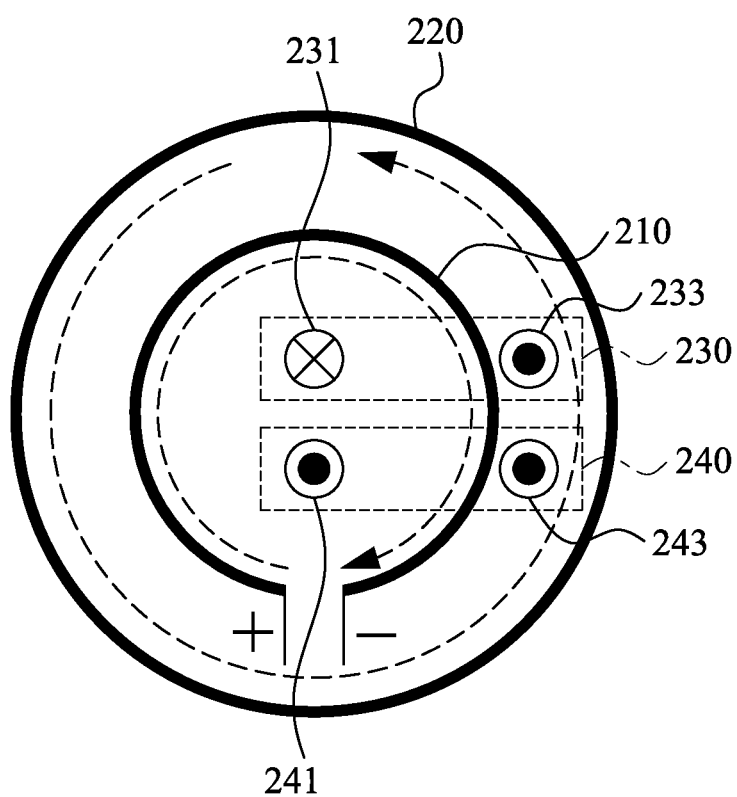
FIGS. 2A and 2B are diagrams illustrating examples of a distribution of a magnetic field in a feeder and a source resonator.
Figure 2B:
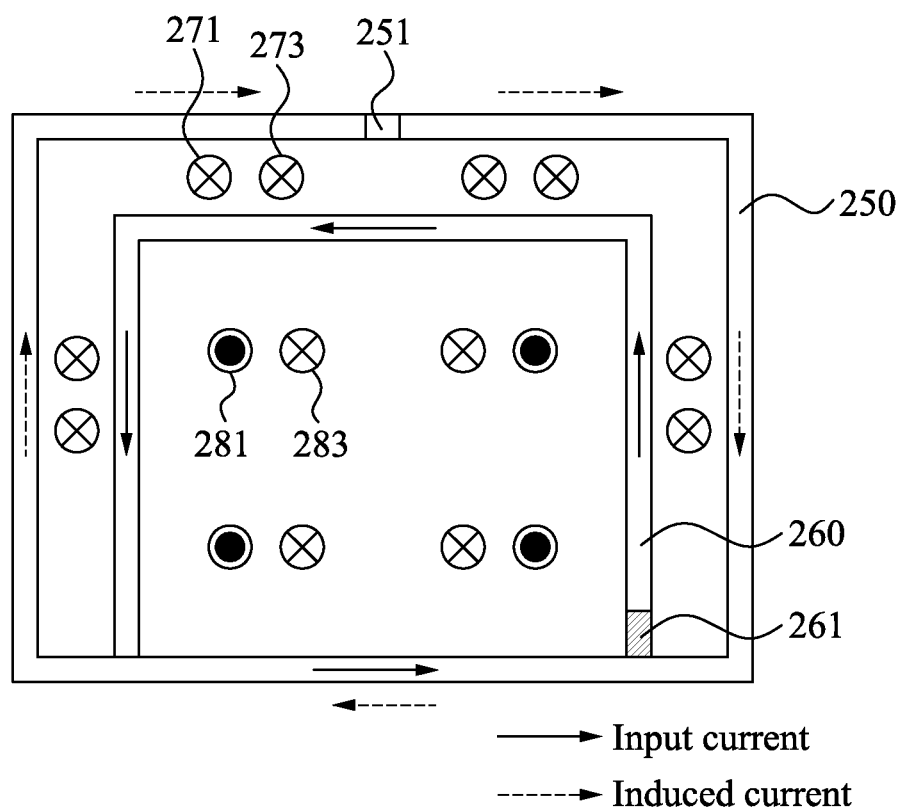

FIGS. 2A and 2B illustrate examples of a distribution of a magnetic field in a feeder and a resonator. In an example in which the resonator receives power supply through the separate feeder, magnetic fields are formed in both the feeder and the resonator.

Referring to FIG. 2A, as an input current flows in a feeder 210, a magnetic field 230 is formed. A direction 231 of the magnetic field 230 within the feeder 210 includes a phase opposite to a phase of a direction 233 of the magnetic field 230 outside the feeder 210. The magnetic field 230 causes an induced current to be formed in a source resonator 220. A direction of the induced current is opposite to a direction of the input current.

Due to the induced current, a magnetic field 240 is formed in the source resonator 220. Directions of the magnetic field 240 in all positions of the source resonator 220 are identical. Accordingly, a direction 241 of the magnetic field 240 in one position of the source resonator 220 includes the same phase as a direction 243 of the magnetic field 240 in another position of the source resonator 220.

Consequently, when the magnetic field 230 formed by the feeder 210 and the magnetic field 240 formed by the source resonator 220 are combined, a strength of a total magnetic field decreases within the feeder 210, but increases outside the feeder 210. In an example in which a power is supplied to the source resonator 220 through the feeder 210, the strength of the total magnetic field decreases in a center of the source resonator 220, but increases in outer edges of the source resonator 220. When a magnetic field is randomly distributed in the source resonator 220, it may be difficult to perform impedance matching, since an input impedance may frequently vary. Additionally, when the strength of the total magnetic field is increased, an efficiency of wireless power transmission may be increased. Conversely, when the strength of the total magnetic field is decreased, the efficiency of wireless power transmission may be decreased. Accordingly, a power transmission efficiency may be reduced on average.

As an example, in a target resonator, a magnetic field is distributed as illustrated in FIG. 2A. For example, the input current flowing in the feeder 210 induces a current flowing in the source resonator 220. A magnetic coupling between the source resonator 220 and the target resonator induces a current flowing in the target resonator. The current flowing in the target resonator causes a magnetic field to be formed, so that an induced current is generated in a feeder located in the target resonator. In this example, within the feeder, a direction of the magnetic field formed by the target resonator includes a phase opposite to a phase of a direction of a magnetic field formed by the feeder, and accordingly, a strength of a total magnetic field is reduced.

FIG. 2B illustrates an example of a wireless power transmitter in which a source resonator 250 and a feeder 260 include a common ground. The source resonator 250 includes a capacitor 251. The feeder 260 receives a radio frequency (RF) signal via a port 261.

For example, when the feeder 260 receives the RF signal, an input current is generated in the feeder 260. The input current flowing in the feeder 260 causes a magnetic field to be formed, and the magnetic field induces a current in the source resonator 250. Additionally, another magnetic field is formed due to the induced current flowing in the source resonator 250. A direction of the input current flowing in the feeder 260 includes a phase opposite to a phase of a direction of the induced current flowing in the source resonator 250. Accordingly, in a region between the source resonator 250 and the feeder 260, a direction 271 of the magnetic field formed due to the input current includes the same phase as a direction 273 of the magnetic field formed due to the induced current, and thus, a strength of a total magnetic field increases. Conversely, within the feeder 260, a direction 281 of the magnetic field formed due to the input current includes a phase opposite to a phase of a direction 283 of the magnetic field formed due to the induced current, and thus, the strength of the total magnetic field decreases. Therefore, the strength of the total magnetic field decreases in the center of the source resonator 250, but increases in outer edges of the source resonator 250.

The feeder 260 adjusts an internal area of the feeder 260 to determine an input impedance. The input impedance refers to an impedance viewed in a direction from the feeder 260 to the source resonator 250. When the internal area of the feeder 260 is increased, the input impedance is increased. Conversely, when the internal area of the feeder 260 is reduced, the input impedance is reduced. Since the magnetic field is randomly-distributed in the source resonator 250 despite a reduction in the input impedance, a value of the input impedance varies depending on a location of a target device. Accordingly, a separate matching network may be required to match the input impedance to an output impedance of a PA. For example, when the input impedance is increased, a separate matching network may be used to match the increased input impedance to a relatively low output impedance.

As an example, when a target resonator includes the same configuration as the source resonator 250, and when a feeder of the target resonator includes the same configuration as the feeder 260, a separate matching network may be required. This is because a direction of a current flowing in the target resonator includes a phase opposite to a phase of a direction of an induced current flowing in the feeder of the target resonator.

Figure 3A:
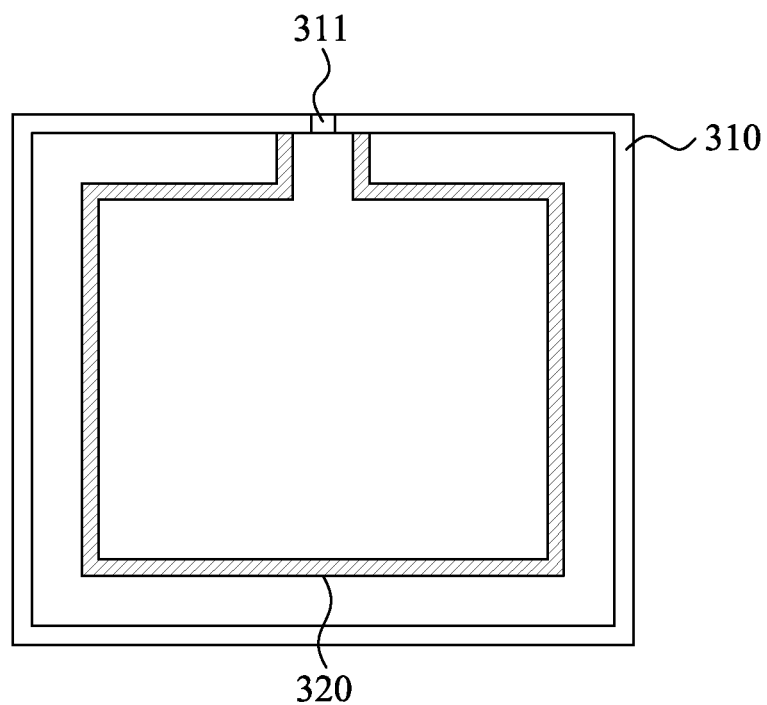
FIGS. 3A and 3B are diagrams illustrating an example of a wireless power transmitter.

FIG. 3A illustrates an example of a wireless power transmitter. The wireless power transmitter includes a resonator 310 and a feeding unit 320. The resonator 310 includes a capacitor 311. The feeding unit 320 is electrically-connected to both ends of the capacitor 311.

Figure 3B:
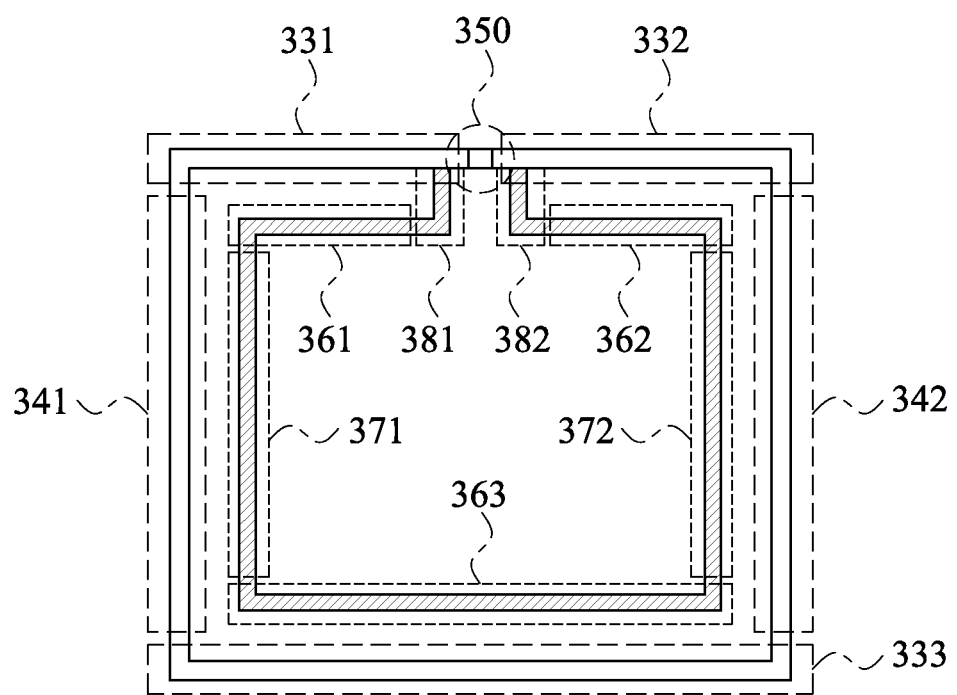

FIG. 3B illustrates, in more detail, an example of the wireless power transmitter of FIG. 3A. The resonator 310 includes a first transmission line, a first conductor 341, a second conductor 342, and at least one first capacitor 350.

The first capacitor 350 is inserted in series between a first signal conducting portion 331 and a second signal conducting portion 332 in the first transmission line, and an electric field is confined within the first capacitor 350. For example, the first transmission line may include at least one conductor in an upper portion of the first transmission line, and may also include at least one conductor in a lower portion of the first transmission line. Current may flow through the conductor disposed in the upper portion of the first transmission line, and the conductor disposed in the lower portion of the first transmission line may be electrically-grounded. Referring to FIG. 3B, a conductor disposed in an upper portion of the first transmission line is separated into and thereby refers to the first signal conducting portion 331 and the second signal conducting portion 332. A conductor disposed in a lower portion of the first transmission line refers to a first ground conducting portion 333.

As illustrated in FIG. 3B, the resonator 310 includes a two-dimensional (2D) structure. The first transmission line includes the first signal conducting portion 331 and the second signal conducting portion 332 in the upper portion of the first transmission line. In addition, the first transmission line includes the first ground conducting portion 333 in the lower portion of the first transmission line. The first signal conducting portion 331 and the second signal conducting portion 332 are disposed to face the first ground conducting portion 333. The current flows through the first signal conducting portion 331 and the second signal conducting portion 332.

Additionally, one end of the first signal conducting portion 331 is electrically-connected (i.e., shorted) to the first conductor 341, and another end of the first signal conducting portion 331 is electrically-connected to the first capacitor 350. One end of the second signal conducting portion 332 is electrically-connected to the second conductor 342, and another end of the second signal conducting portion 332 is electrically-connected to the first capacitor 350. Accordingly, the first signal conducting portion 331, the second signal conducting portion 332, the first ground conducting portion 333, and the conductors 341 and 342 are electrically-connected to each other, so that the resonator 310 includes an electrically closed-loop structure. The term "closed-loop structure" may include a polygonal structure, for example, a circular structure, a rectangularly structure, and/or other types of structures that is electrically-closed.

The first capacitor 350 is inserted into an intermediate portion of the first transmission line. For example, the first capacitor 350 is inserted into a space between the first signal conducting portion 331 and the second signal conducting portion 332. The first capacitor 350 may include a shape of, for example, a lumped element, a distributed element, and/or other types of elements. For example, a distributed capacitor configured as a distributed element may include zigzagged conductor lines and a dielectric material including a high permittivity between the zigzagged conductor lines.

When the first capacitor 350 is inserted into the first transmission line, the resonator 310 may include a characteristic of a metamaterial. The metamaterial indicates a material including a predetermined electrical property that has not been discovered in nature, and thus, may include an artificially-designed structure. An electromagnetic characteristic of the materials existing in nature may include a unique magnetic permeability and/or a unique permittivity. Most materials may include a positive magnetic permeability and/or a positive permittivity.

In the case of most materials, a right hand rule may be applied to an electric field, a magnetic field, and a Poynting vector, and thus, the corresponding materials may be referred to as right handed materials (RHMs). However, the metamaterial including a magnetic permeability and/or a permittivity absent in nature may be classified into, for example, an epsilon negative (ENG) material, a mu negative (MNG) material, a double negative (DNG) material, a negative refractive index (NRI) material, a left-handed (LH) material, and/or other types of materials, based on a sign of the corresponding permittivity and/or magnetic permeability.

When a capacitance of the first capacitor 350 inserted as the lumped element is appropriately determined, the resonator 310 may include the characteristic of the metamaterial. Because the resonator 310 may include a negative magnetic permeability by appropriately adjusting a capacitance of the first capacitor 350, the resonator 310 may also be referred to as an MNG resonator. Various criteria may be applied to determine the capacitance of the first capacitor 350. For example, the various criteria may include a criterion to enable the resonator 310 to include the characteristic of the metamaterial, a criterion to enable the resonator 310 to include a negative magnetic permeability in a target frequency, a criterion to enable the resonator 310 to include a zeroth-order resonance characteristic in the target frequency, and/or other types of criteria. Based on at least one criterion among the aforementioned criteria, the capacitance of the first capacitor 350 may be determined.

The resonator 310, also referred to as the MNG resonator 310, may include a zeroth-order resonance characteristic of including, as a resonance frequency, a frequency when a propagation constant is "0". Because the resonator 310 may include the zeroth-order resonance characteristic, the resonance frequency may be independent with respect to a physical size of the MNG resonator 310. By appropriately designing the first capacitor 350, the MNG resonator 310 may sufficiently change the resonance frequency. Accordingly, the physical size of the MNG resonator 310 may not be changed.

In a near field, the electric field may be concentrated on the first capacitor 350 inserted into the first transmission line. Accordingly, due to the first capacitor 350, the magnetic field may become dominant in the near field. The MNG resonator 310 may include a relatively high Q-factor using the first capacitor 350 of the lumped element. Thus, it is possible to enhance a power transmission efficiency. For example, the Q-factor may indicate a level of an ohmic loss or a ratio of a reactance with respect to a resistor in a wireless power transmission. The efficiency of the wireless power transmission may increase according to an increase in the Q-factor.

Although not illustrated in FIG. 3B, a magnetic core may be further provided to pass through the MNG resonator 310. The magnetic core may increase a power transmission distance.

Referring to FIG. 3B, the feeding unit 320 includes a second transmission line, a third conductor 371, a fourth conductor 372, a fifth conductor 381, and a sixth conductor 382. The second transmission line includes a third signal conducting portion 361 and a fourth signal conducting portion 362 in an upper portion of the second transmission line. In addition, the second transmission line includes a second ground conducting portion 363 in a lower portion of the second transmission line. The third signal conducting portion 361 and the fourth signal conducting portion 362 are disposed to face the second ground conducting portion 363. Current flows through the third signal conducting portion 361 and the fourth signal conducting portion 362.

Additionally, one end of the third signal conducting portion 361 is electrically-connected to the third conductor 371, and another end of the third signal conducting portion 361 is electrically-connected to the fifth conductor 381. One end of the fourth signal conducting portion 362 is electrically-connected to the fourth conductor 372, and another end of the fourth signal conducting portion 362 is electrically-connected to the sixth conductor 382. The fifth conductor 381 is electrically-connected to the first signal conducting portion 331, and the sixth conductor 382 is electrically-connected to the second signal conducting portion 332. The fifth conductor 381 and the sixth conductor 382 are electrically-connected in parallel to both ends of the first capacitor 350. The fifth conductor 381 and the sixth conductor 382 are used as input ports to receive an RF signal.

Accordingly, the third signal conducting portion 361, the fourth signal conducting portion 362, the second ground conducting portion 363, the third conductor 371, the fourth conductor 372, the fifth conductor 381, the sixth conductor 382, and the resonator 310 are electrically-connected to each other, so that the resonator 310 and the feeding unit 320 include an electrically closed-loop structure. When the RF signal is received via the fifth conductor 381 or the sixth conductor 382, an input current flows in the feeding unit 320 and the resonator 310, a magnetic field is formed due to the input current, and a current is induced in the resonator 310 due to the formed magnetic field. A direction of the input current flowing in the feeding unit 320 is identical to a direction of the induced current flowing in the resonator 310, and thus, a strength of a total magnetic field increases in a center of the resonator 310, but decreases in outer edges of the resonator 310.

An input impedance is determined based on an area of a region between the resonator 310 and the feeding unit 320, and accordingly, a separate matching network used to match the input impedance to an output impedance of a power amplifier may not be required. For example, even when the matching network is used, the input impedance may be determined by adjusting a size of the feeding unit 320, and thus, a structure of the matching network may be simplified. The simplified structure of the matching network may minimize a matching loss of the matching network.

The second transmission line, the third conductor 371, the fourth conductor 372, the fifth conductor 381, and the sixth conductor 382 form the same structure as the resonator 310. In an example in which the resonator 310 includes a loop structure, the feeding unit 320 may also include a loop structure. In another example in which the resonator 310 includes a circular structure, the feeding unit 320 may also include a circular structure.

Figure 4A:
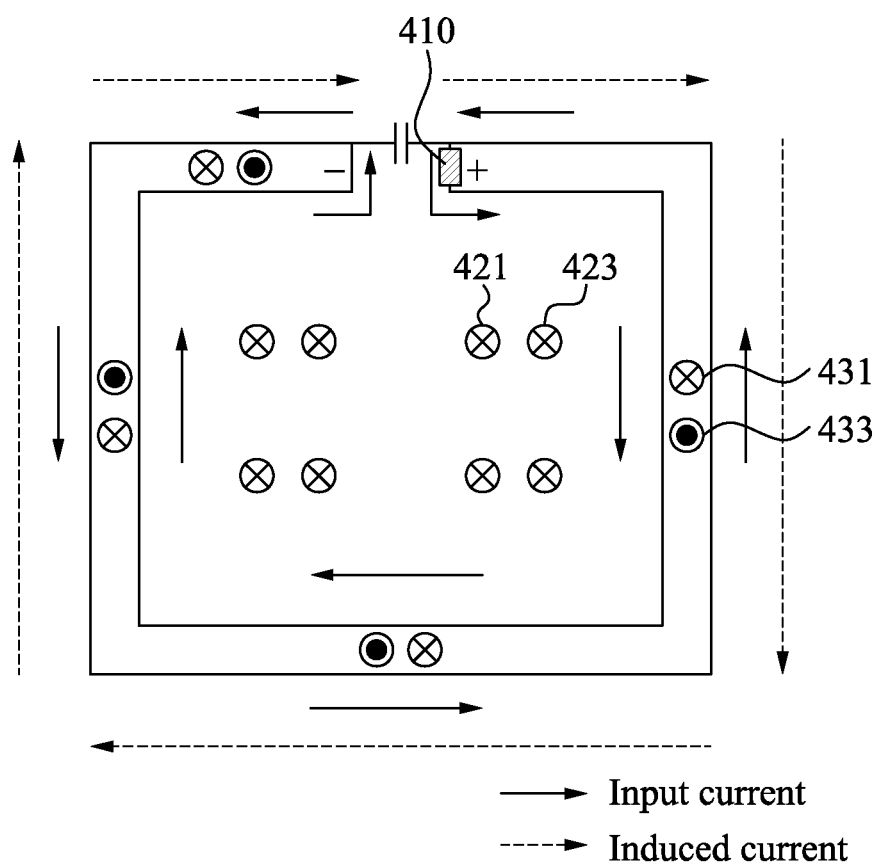
FIG. 4A is a diagram illustrating an example of a distribution of a magnetic field in a source resonator based on feeding of a feeding unit.

FIG. 4A illustrates an example of a distribution of a magnetic field in a resonator based on feeding of a feeding unit. FIG. 4A more briefly illustrates the resonator 310 and the feeding unit 320 of FIG. 3A.

A feeding operation in a wireless power transmission refers to supplying a power to a source resonator, or refers to supplying AC power to a rectification unit. FIG. 4A illustrates a direction of an input current flowing in the feeding unit, and a direction of an induced current induced in the source resonator. Additionally, FIG. 4A illustrates a direction of a magnetic field formed due to the input current, and a direction of a magnetic field formed due to the induced current.

A fifth conductor or a sixth conductor of the feeding unit may be used as an input port 410. The input port 410 receives an RF signal output from a PA. The PA may increase and decrease an amplitude of the RF signal, on demand of a target device. The RF signal is displayed in the form of the input current flowing in the feeding unit. The input current flows in a clockwise direction in the feeding unit, along a transmission line of the feeding unit. The fifth conductor is electrically-connected to the resonator, e.g., a first signal conducting portion of the resonator. Accordingly, the input current flows in the resonator, as well as, in the feeding unit. The input current flows in a counterclockwise direction in the resonator. The input current flowing in the resonator causes a magnetic field to be formed so that an induced current is generated in the resonator due to the magnetic field. The induced current flows in a clockwise direction in the resonator. The induced current transfers energy to a capacitor of the resonator, and a magnetic field is formed due to the induced current. The input current flowing in the feeding unit and the resonator is indicated by a solid line of FIG. 4A, and the induced current flowing in the resonator is indicated by a dotted line of FIG. 4A.

A direction of a magnetic field formed due to current may be determined based on the right hand rule. As illustrated in FIG. 4A, within the feeding unit, a direction 421 of the magnetic field formed due to the input current flowing in the feeding unit is identical to a direction 423 of the magnetic field formed due to the induced current. Accordingly, a strength of a total magnetic field increases within the feeding unit.

Additionally, in a region between the feeding unit and the resonator, a direction 433 of the magnetic field formed due to the input current flowing in the feeding unit includes a phase opposite to a phase of a direction 431 of the magnetic field formed due to the induced current. Accordingly, the strength of the total magnetic field decreases in the region between the feeding unit and the resonator.

Typically, a strength of a magnetic field decreases in a center of a resonator with a loop structure, and increases in outer edges of the resonator. However, referring to FIG. 4A, the feeding unit is electrically-connected to both ends of the capacitor of the resonator, and accordingly, the induced current flows in the same direction as the input current of the feeding unit. Since the induced current flows in the same direction as the input current of the feeding unit, the strength of the total magnetic field increases within the feeding unit, and decreases outside the feeding unit. As a result, the strength of the total magnetic field increases in a center of the resonator with the loop structure, and decreases in the outer edges of the resonator, due to the feeding unit. Thus, the strength of the total magnetic field is equalized within the resonator.

Additionally, a power transmission efficiency of transferring a power from the source resonator to a target resonator is proportional to the strength of the total magnetic field formed in the source resonator. When the strength of the total magnetic field increases in the center of the source resonator, the power transmission efficiency also increases.

Figure 4B:
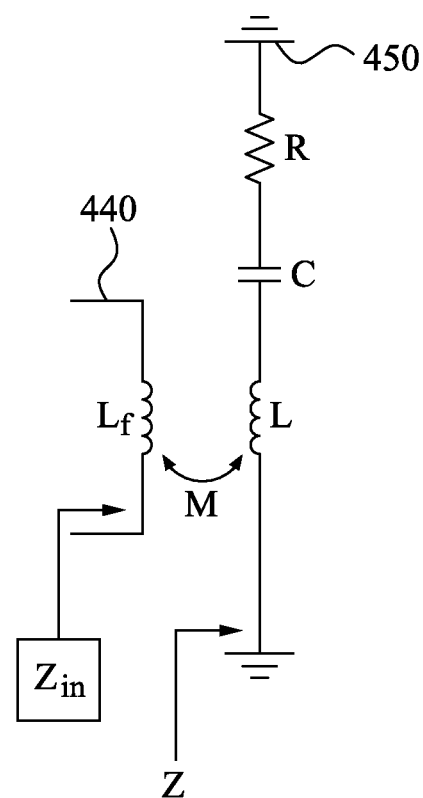
FIG. 4B is a diagram illustrating examples of equivalent circuits of a feeding unit and a source resonator.

FIG. 4B illustrates an equivalent circuit of a feeding unit 440, and an equivalent circuit of a resonator 450. An input impedance $Z_{in}$ viewed in a direction from the feeding unit 440 to the resonator 450 may be computed, as given in Equation 4.

$$Z_{in} = \frac{(\omega M)^2}{Z} \qquad [\text{Equation 4}]$$

In Equation 4, M denotes a mutual inductance between the feeding unit 440 and the resonator 450, ω denotes a resonance frequency between the feeding unit 440 and the resonator 450, and Z denotes an impedance viewed in a direction from the resonator 450 to a target device. The input impedance $Z_{in}$ is proportional to the mutual inductance M. Accordingly, the input impedance $Z_{in}$ may be controlled by adjusting the mutual inductance M. The mutual inductance M may be adjusted based on an area of a region between the feeding unit 440 and the resonator 450. The area of the region between the feeding unit 440 and the resonator 450 may be adjusted based on a size of the feeding unit 440. The input impedance $Z_{in}$ may be determined based on the size of the feeding unit 440, and thus, a separate matching network may not be required to perform impedance matching with an output impedance of a PA.

For a target resonator and a feeding unit included in a wireless power receiver, a magnetic field is distributed as illustrated in FIG. 4A. For example, the target resonator receives a wireless power from a source resonator, using magnetic coupling. Due to the received wireless power, an induced current is generated in the target resonator. A magnetic field formed due to the induced current causes another induced current to be generated in the feeding unit. In this example, when the target resonator is connected to the feeding unit as illustrated in FIG. 4A, the induced current generated in the target resonator flows in the same direction as the induced current generated in the feeding unit. Thus, a strength of a total magnetic field increases within the feeding unit, but decreases in a region between the feeding unit and the target resonator.

Figure 5:
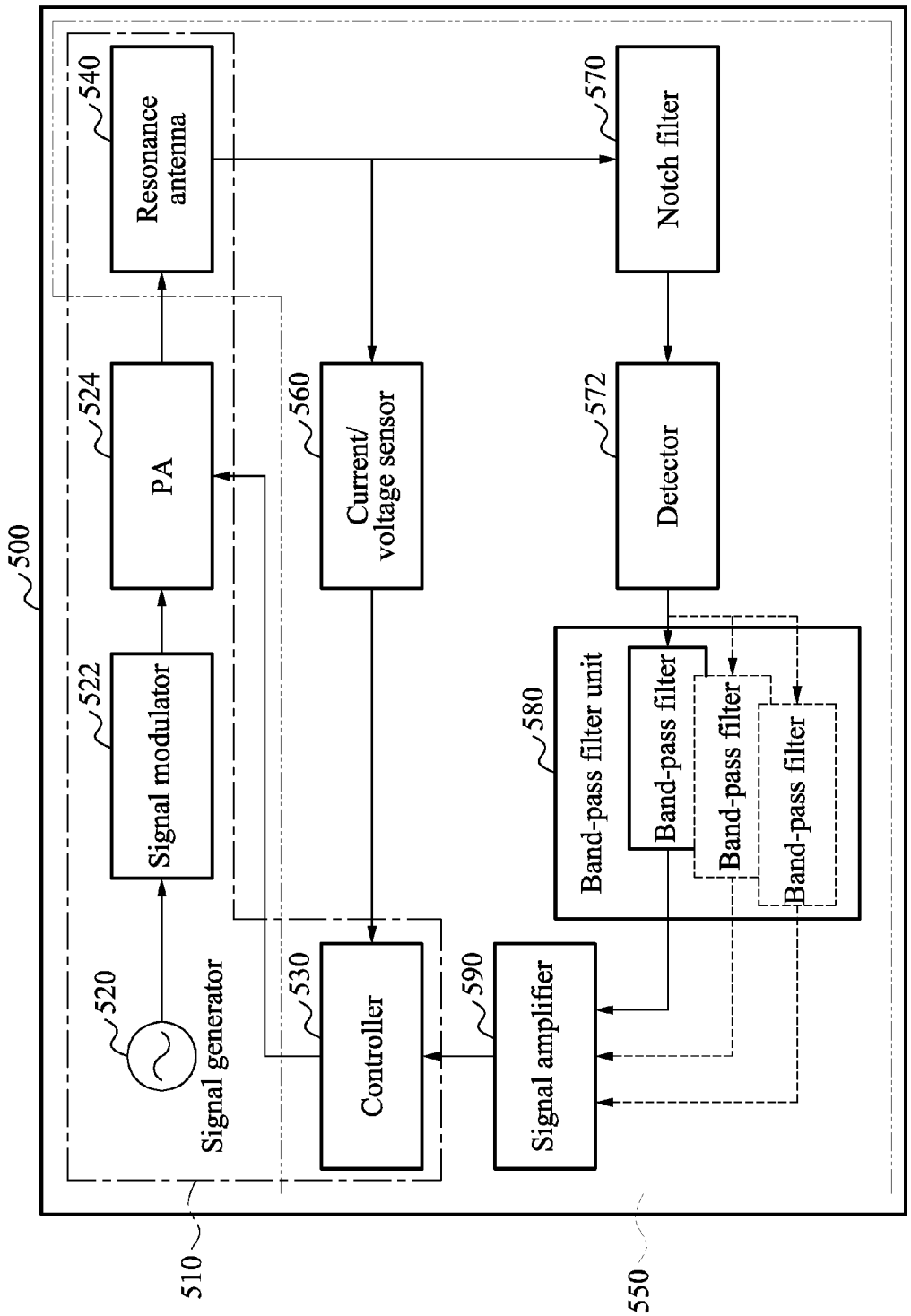
FIG. 5 is a block diagram illustrating an example of a source device.

FIG. 5 illustrates an example of a source device 500. The source device 500 may be, for example, the source device 110 of FIG. 1. The source device 500 functions as a wireless power transmitter. The source device 500 wirelessly transmits a power to at least one target device, and may perform in-band data communication with the target device.

The source device 500 includes a signal generator 520, a signal modulator 522, a PA 524, a controller 530, a resonance antenna 540, a current and voltage (current/voltage) sensor 560, a notch filter 570, a detector 572, a band-pass filter unit 580, and a signal amplifier 590. The resonance antenna 540, the PA 524, and the controller 530 may correspond to the source resonator 116, the power converter 114, and the control/communication unit 115 of FIG. 1, respectively.

A transmission block 510 includes elements used to transmit the wireless power and data. The transmission block 510 includes the signal generator 520, the signal modulator 522, the PA 524, the controller 530, and the resonance antenna 540.

A reception block 550 includes elements used to receive data from the target device. The reception block 550 includes the controller 530, the resonance antenna 540, the current/ voltage sensor 560, the notch filter 570, the detector 572, the band-pass filter unit 580, and the signal amplifier 590.

The signal generator 520 generates a carrier signal. The carrier signal is used to generate a main carrier frequency $f_c$. In other words, the main carrier frequency $f_c$ is included in the generated carrier signal. Additionally, the carrier signal is used to transmit the power and the data. The main carrier frequency $f_c$ is a power transmission frequency used to transmit the power.

The signal modulator 522 modulates the carrier signal, to obtain a TX-modulated carrier signal in which information for data transmission is loaded or included. The data transmission is data communication between the source device 500 and the target device that will be described below. The carrier signal may be modulated by, for example, on-off keying (OOK), amplitude shift keying (ASK), and other types of modulation schemes.

The PA 524 amplifies the TX-modulated carrier signal to a power required to charge the target device, based on a control of the controller 530. Hereinafter, a signal output by the PA 524 is referred to as a PA signal.

The resonance antenna 540 wirelessly transmits the PA signal to the target device. For example, the resonance antenna 540 transmits the power and the data to the target device.

The target device transmits the data to the source device 500. To transmit the data, the target device modulates a load of the target device, which will be described with reference to FIG. 6. The modulating of the load influences a signal (namely, the PA signal) applied to the resonance antenna 540, via the resonance antenna 540 and a resonance antenna of the target device. Additionally, the signal applied to the resonance antenna 540 is regarded to be a signal received by the resonance antenna 540. For example, when the load of the target device is modulated, the signal received by the resonance antenna 540 is also modulated. In the example of FIG. 5, the modulated PA signal is referred to as a received signal.

The current/voltage sensor 560 generates information required to monitor a current and/or a voltage of the PA signal based on the received signal. The current/voltage sensor 560 senses the received signal, and generates the information. For example, the current/voltage sensor 560 may include a resistor. A portion of the received signal may flow through the resistor. The portion of the received signal flowing through the resistor may be a portion of a voltage extracted from the power of the received signal. The current/voltage sensor 560 may provide the controller 530 with voltage signals at both ends of the resistor. The controller 530 may calculate the current and/or the voltage of the received signal, based on a resistance value of the resistor, and based on values of voltages applied to both the ends of the resistor.

The controller 530 controls the PA 524 so that the PA signal includes a power required to charge the target device, based on the calculated current and/or the voltage of the received signal. Additionally, based on the calculated current and/or the voltage, the controller 530 identifies the power required by the target device based on the calculated current and/or the voltage, and may determine whether a target device configured to receive a power exists, whether a predetermined target device among target devices is completely charged, and/or whether a new target device is added.

The received signal includes at least one sub-carrier. The sub-carrier is generated when the target device modulates the load of the target device. The controller 530 receives data from the target device, based on the sub-carrier. The data may include, for example, in-band communication data for in-band communication between the source device 500 and the target device. The sub-carrier is allocated to a predetermined target device. A method of allocating a sub-carrier to a target device will be further described with reference to FIGS. 7 to 9.

The notch filter 570 mitigates a main carrier in the received signal, to smoothly demodulate the received signal. The main carrier may correspond to the reference resonance frequency $F_{Ref}$ of FIG. 1.

The detector 572 removes the main carrier from the received signal to demodulate the received signal. The detector 572 may employ a demodulation scheme corresponding to a modulation scheme used by the target device to transmit data. The demodulated signal includes reception (RX) data in which the demodulated sub-carrier without a main carrier is loaded.

The band-pass filter unit 580 extracts the sub-carrier from the demodulated signal. The band-pass filter unit 580 includes at least one band-pass filter, for example, at least one narrow band-pass filter. The band-pass filter may include, for example, an analog filter or a digital filter. A configuration of the band-pass filter unit 580 may be changed based on which sub-carriers in the received signal are allocated to target devices. In other words, the configuration of the band-pass filter unit 580 may be changed depending on whether a predetermined sub-carrier is used.

Each band-pass filter may correspond to a single sub-carrier among the sub-carriers in the received signal. Each band-pass filter may extract, from the demodulated signal, a predetermined sub-carrier among the sub-carriers in the received signal, through filtering. Among band-pass filters of the band-pass filter unit 580, only a band-pass filter corresponding to a sub-carrier allocated to a target device is operated.

The signal amplifier 590 amplifies the sub-carrier extracted by the band-pass filter unit 580. The band-pass filter unit 580 and the signal amplifier 590 may be included in the controller 530.

The controller 530 detects an envelope of the sub-carrier. The controller 530 receives the data from the target device, based on logical values '1' and '0' in the detected envelope. That is, the data transmitted by the target device is represented as the logical values '1' and '0' in the envelope generated from the sub-carrier used by the target device.

The controller 530 increases and reduces a number of the sub-carriers (namely, a number of frequency bands of the sub-carriers) allocated to target devices adaptively based on an environment of the source device 500 and the target devices. When the number of the sub-carriers is increased or reduced, the controller 530 adjusts the allocation of the sub-carriers to the target devices, based on the increase or the reduction in the number of the sub-carriers.

Figure 6:
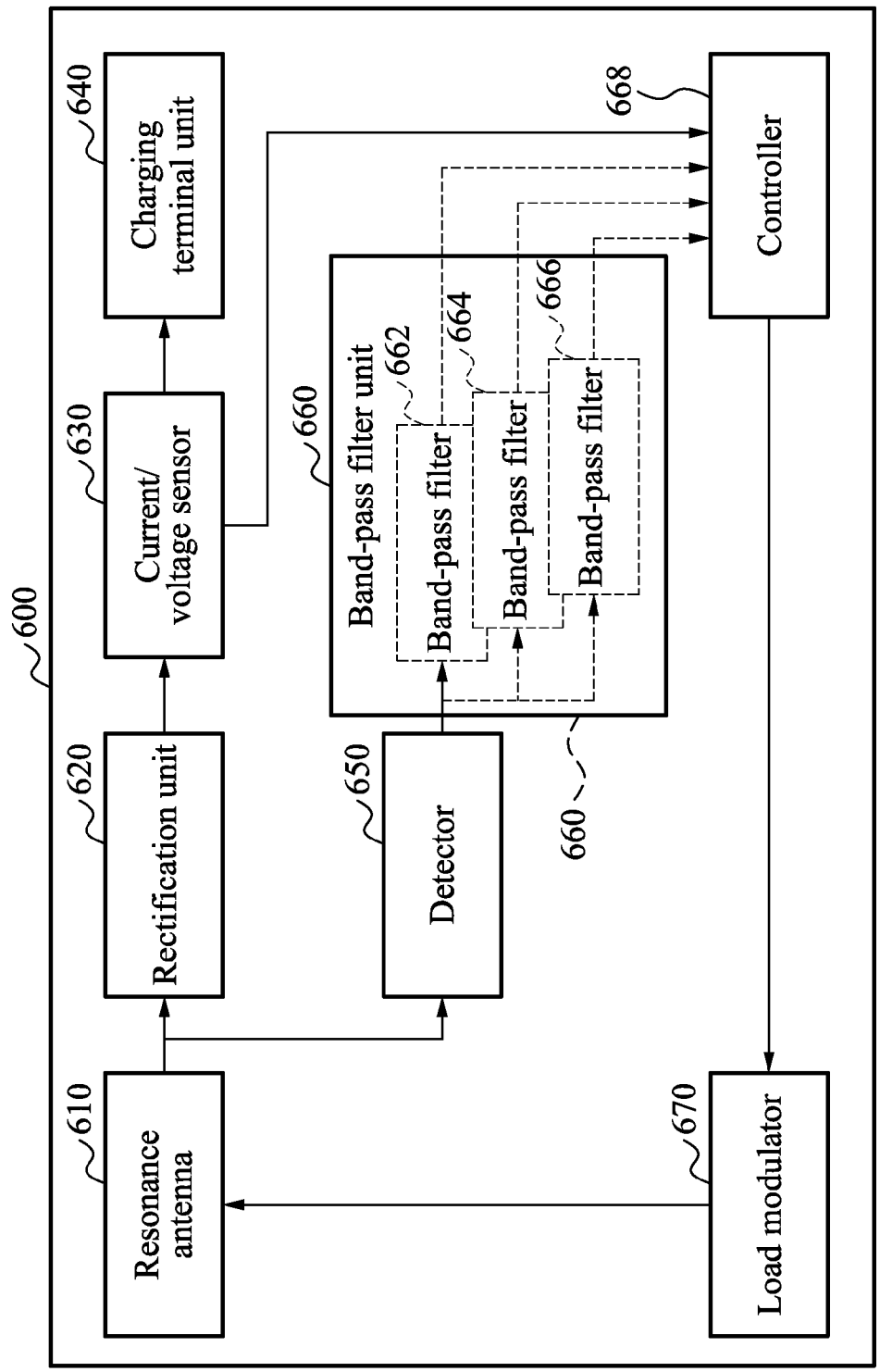
FIG. 6 is a block diagram illustrating an example of a target device.

FIG. 6 illustrates an example of a target device 600. The target device 600 may be, for example, the target device 120 of FIG. 1. The target device 600 functions as a wireless power receiver.

The target device 600 includes a resonance antenna 610, a rectification unit 620, a current/voltage sensor 630, a charging terminal unit 640, a detector 650, a band-pass filter unit 660, a controller 668, and a load modulator 670. The resonance antenna 610, the rectification unit 620, and the charging terminal unit 640 may correspond to the target resonator 121, the rectification unit 122, and the charging unit 125 of FIG. 1, respectively. Additionally, the controller 668 and the load modulator 670 may correspond to the control/communication unit 126 of FIG. 1.

The resonance antenna 610 receives a signal from the resonance antenna 540 of the source device 500 of FIG. 5. For example, the resonance antenna 610 receives a power and data (power/data) signal from the source device 500. In the example of FIG. 6, the power/data signal received by the resonance antenna 610 is referred to as a received signal.

The rectification unit 620 rectifies the received signal to generate DC. That is, the rectification unit 620 rectifies a power received through the received signal. The rectified DC is transmitted to the charging terminal unit 640. A load is connected to the charging terminal unit 640. The current/voltage sensor 630 generates information required to monitor a current and a voltage provided to the load. For example, the current/voltage sensor 630 may include a resistor. A portion of a power provided to the load may flow through the resistor. The current/voltage sensor 630 may provide the controller 668 with voltage signals at both ends of the resistor. The controller 668 may calculate the current and/or the voltage of the power provided to the charging terminal unit 640 (and/or the load), based on a resistance value of the resistor, and values of voltages applied to the ends of the resistor. A signal output via the current/voltage sensor 630 corresponds to a DC used to charge the load.

The controller 668 verifies an amount of a power to charge the load, based on the calculated current and/or the voltage. The controller 668 generates data to be transmitted to the source device 500, and generates a data communication signal including the data.

The data indicates information regarding various states of the target device 600, for example, charging completion, battery overheating, overvoltage, overcurrent, and/or other types of information. The controller 668 generates the data based on the amount of the power to charge the load. For example, when charging of the load is completed, the controller 668 generates data representing a message stating completion of the charging of the load, or a message requesting interruption of wireless power transmission to the target device 600.

The controller 668 controls the load modulator 670, using the data communication signal. The controller 668 controls the load modulator 670 to transmit the data to the source device 500 using a transmitted signal. The transmitted signal is transmitted from the resonance antenna 610 to the source device 500.

The load modulator 670 changes or modulates the load of the target device 600 to generate and modulate the transmitted signal. The transmitted signal includes at least one sub-carrier. The load modulator 670 transmits the data to the source device 500, using the sub-carrier allocated to the target device 600 among sub-carriers allocated to the target device 600. The data communication signal generated by the controller 668 may be used to generate the allocated sub-carrier.

The load modulator 670 may include a switch. When the data communication signal includes a logical value '1', the switch is closed or short-circuited. When the data communication signal includes a logical value '0', the switch is opened. For example, when the switch is closed, the load of the target device 600 is changed, and the power/data signal transmitted from the source device 500 to the target device 600 is reflected. In this example, the power/data signal may be the PA signal transmitted wirelessly by the resonance antenna 540 of FIG. 5. Additionally, a change in the load of the target device 600 indicates that a load impedance of the target device 600 is 0. In another example, when the switch is opened, the load of the target device 600 is changed, and the power/data signal passes through the target device 600, instead of being reflected. In other words, the load modulator 670 modulates the signal applied to the resonance antenna 540, namely, the PA signal.

As described above, when a reflected wave is transmitted, the source device 500 recognizes the data transmitted from the target device 600. For example, when the data includes information on a state of the target device 600, the source device 500 performs an operation based on the information, and for example, may change the PA signal.

The detector 650 extracts data from the received signal. In more detail, the detector 650 removes a main carrier from the received signal to demodulate the received signal. The detector 650 employs a demodulation scheme corresponding to the modulation scheme used by the source device 500 to transmit data. The demodulated signal includes TX data in which at least one demodulated sub-carrier is loaded after the main carrier is removed. Hereinafter, the sub-carrier included in the demodulated signal is referred to as a received sub-carrier, and at least one sub-carrier included in the transmitted signal is referred to as a transmitted sub-carrier. A portion or all of received sub-carriers may include the same frequency as one transmitted sub-carrier among transmitted sub-carriers.

The band-pass filter unit 660 extracts the received sub-carrier from the demodulated signal. The band-pass filter unit 660 includes at least one band-pass filter, for example, a first band-pass filter 662, a second band-pass filter 664, and a third band-pass filter 666, as illustrated in FIG. 6.

Each of the band-pass filters 662, 664, and 666 may correspond to a single respective received sub-carrier among the received sub-carriers. Each of the band-pass filters 662, 664, and 666 extracts the respective received sub-carrier from the demodulated signal through filtering.

Each of the band-pass filters 662, 664, and 666 corresponding to the respective received sub-carrier allocated to the target device 600 extracts the respective received sub-carrier. The extracted sub-carrier is transferred to the controller 668. For example, a sub-carrier allocated by the source device 500 to transfer data to the target device 600 is transferred to the controller 668 through the band-pass filter 662, 664, or 666 corresponding to the allocated sub-carrier.

The controller 668 detects an envelope of the extracted sub-carrier. The controller 668 recognizes the data received from the source device 500, based on logical values '1' and '0' in the detected envelope. For example, the data transmitted by the source device 500 using the received signal may be represented as logical values '1' and '0' in the envelope generated from the sub-carrier allocated to the target device 600.

As described above, a source device allocates at least one sub-carrier to at least one target device, respectively. Allocating a sub-carrier to a predetermined target device may include allocating a wireless channel for data communication in wireless power transmission between the source device and the predetermined target device. Each sub-carrier may correspond to a wireless channel.

Figure 7:
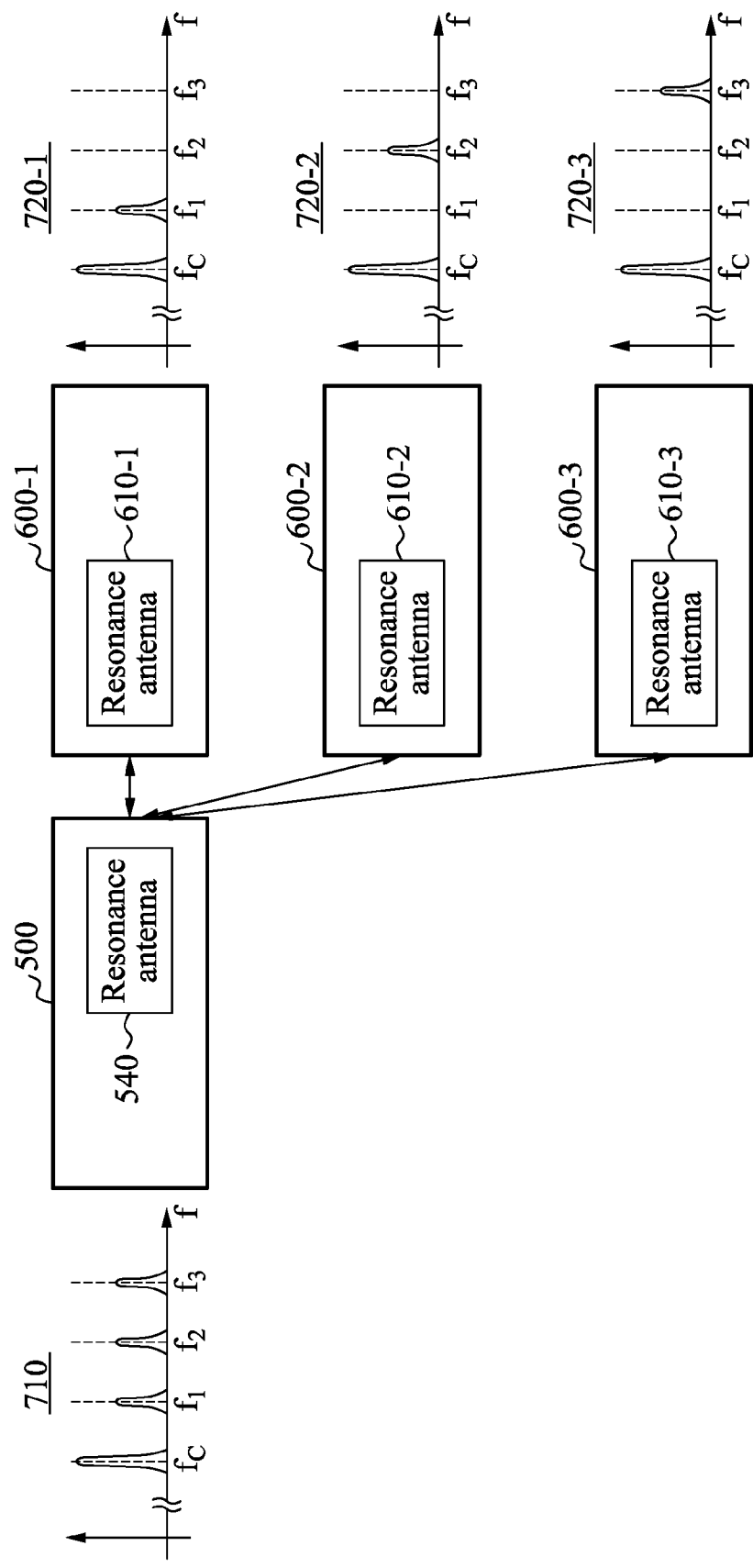
FIG. 7 is a diagram illustrating an example of a wireless channel allocation method using a frequency division multiple access (FDMA) scheme.

FIG. 7 illustrates an example of a wireless channel allocation method using a frequency division multiple access (FDMA) scheme. The source device 500 (e.g., of FIG. 5) performs data communication through wireless power transmission with target devices 600-1, 600-2, and 600-3 (e.g., the target device 600 of FIG. 6). In other words, a single wireless power transmitter communicates with three wireless power receivers.

Graphs 710, 720-1, 720-2, and 720-3 of FIG. 7 represent data communication channels used between the source device 500 and the target devices 600-1 to 600-3 in a frequency (f) domain. Additionally, $f_c$ indicates a frequency of a main carrier, and $f_1$, $f_2$ and $f_3$ indicate frequencies of sub-carriers.

The source device 500 distributes the sub-carriers to the target devices 600-1 to 600-3, using the FDMA scheme. For example, the controller 530 (e.g., of FIG. 5) of the source device 500 allocates the frequencies $f_1$, $f_2$ and $f_3$ to the target devices 600-1 to 600-3, respectively. In other words, the controller 530 allocates the data communication channels to the target devices 600-1 to 600-3, respectively. For example, the target device 600-1 transmits data to the source device 500, using the sub-carrier with the frequency $f_1$, or using a data communication channel with frequency $f_1$.

The controller 530 demodulates a signal or data from the frequencies $f_c$, $f_1$, $f_2$ and $f_3$, to perform the data communication with the target devices 600-1 to 600-3. Since the different sub-carriers are respectively allocated to the target devices 600-1 to 600-3, signals in which data is loaded do not collide or interfere with each other, even when the target devices 600-1 to 600-3 simultaneously transmit or reflect the signals. Accordingly, as illustrated in the graph 710, the controller 530 receives all of the data transmitted simultaneously by the target devices 600-1 to 600-3 through the frequencies $f_1$, $f_2$ and $f_3$, respectively.

The controller 530 adjusts a frequency of each of the sub-carriers to be allocated to the target devices 600-1 to 600-3, based on a channel environment, a characteristic Q of the resonance antenna 540 (e.g., of FIG. 5) of the source device 500, and characteristics Q of resonance antennas 610-1, 610-2, and 610-3 (e.g., the resonance antenna 610 of FIG. 6). The characteristics Q may refer to Q-factors.

The controller 530 may allocate only a portion of a sub-carrier to each of the target devices 600-1 to 600-3. Additionally, the controller 530 may allocate a sub-carrier to a predetermined target device. The band-pass filter unit 580 (e.g., of FIG. 5) of the source device 500, and the band-pass filter unit 660 (e.g., of FIG. 6) of the target device 600 may include at least one band-pass filter corresponding to at least one allocated sub-carrier.

Figure 8:
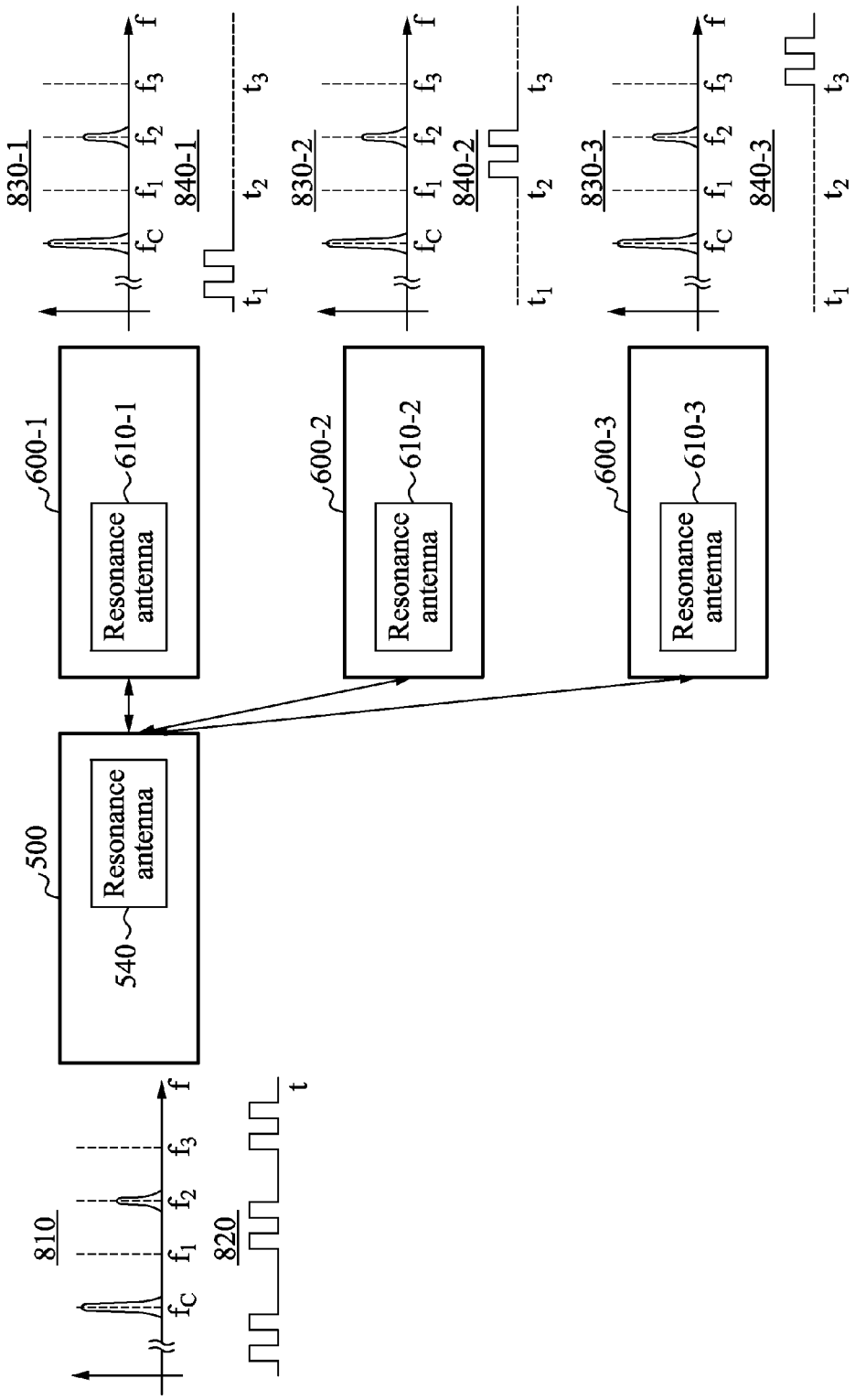
FIG. 8 is a diagram illustrating an example of a wireless channel allocation method using a time division multiple access (TDMA) scheme.

FIG. 8 illustrates an example of a wireless channel allocation method using a time division multiple access (TDMA) scheme. The source device 500 (e.g., of FIG. 5) performs data communication through wireless power transmission with target devices 600-1, 600-2, and 600-3 (e.g., the target device 600 of FIG. 6). In other words, a single wireless power transmitter communicates with three wireless power receivers.

Graphs 810, 830-1, 830-2, and 830-3 of FIG. 8 represent data communication channels used between the source device 500 and the target devices 600-1 to 600-3 in a frequency (f) domain. Additionally, $f_c$ indicates a frequency of a main carrier, and $f_1$, $f_2$ and $f_3$ indicate frequencies of sub-carriers.

The source device 500 distributes the sub-carriers to target devices 600-1 to 600-3, using the TDMA scheme. For example, the controller 530 (e.g., of FIG. 5) of the source device 500 allocates the frequency $f_2$ to the target devices 600-1 to 600-3 in a time division manner. That is, the target devices 600-1 to 600-3 uses the same communication channel in different time slots. Each of the target devices 600-1 to 600-3 transmits data to the source device 500, using the sub-carrier with the frequency $f_2$ allocated to each of the target devices 600-1 to 600-3, in a time slot assigned to each of the target devices 600-1 to 600-3.

Each of graphs 840-1, 840-2, and 840-3 of FIG. 8 represents a signal transmitted from each of the target devices 600-1 to 600-3 to the source device 500, over time (t). As illustrated in the graphs 840-1 to 840-3, a communication channel corresponding to a time slot from time $t_1$ to time $t_2$ is allocated to the target device 600-1, a communication channel corresponding to a time slot from time $t_2$ to time $t_3$ is allocated to the target device 600-2, and a communication channel corresponding to a time slot after time $t_3$ is allocated to the target device 600-3. The target devices 600-1 to 600-3 transmits the data to the source device 500, using the sub-carrier with the frequency $f_2$, in the time slots assigned to the target devices 600-1 to 600-3, respectively.

The controller 530 allocates at least one communication channel to at least one target device in the time division manner, and determines which communication channel is allocated to a target device in a predetermined time slot. For example, a graph 820 of FIG. 8 represents a signal received by the source device 500 over time (t). As illustrated in the graph 820, the controller 530 receives the data from the target devices 600-1 to 600-3 through the sub-carrier with the frequency $f_2$. The controller 530 identifies which one of the target devices 600-1 to 600-3 transmits the data in a predetermined time slot, and processes the data received from the identified target device.

The controller 530 demodulates a time-distributed signal as data received from a predetermined target device among target devices, and performs the data communication with the target devices. For example, when the target devices transmit data simultaneously at the same time, the transmitted data collide with each other. When the data collides, the target devices may re-transmit the data after a predetermined period of time.

Figure 9:
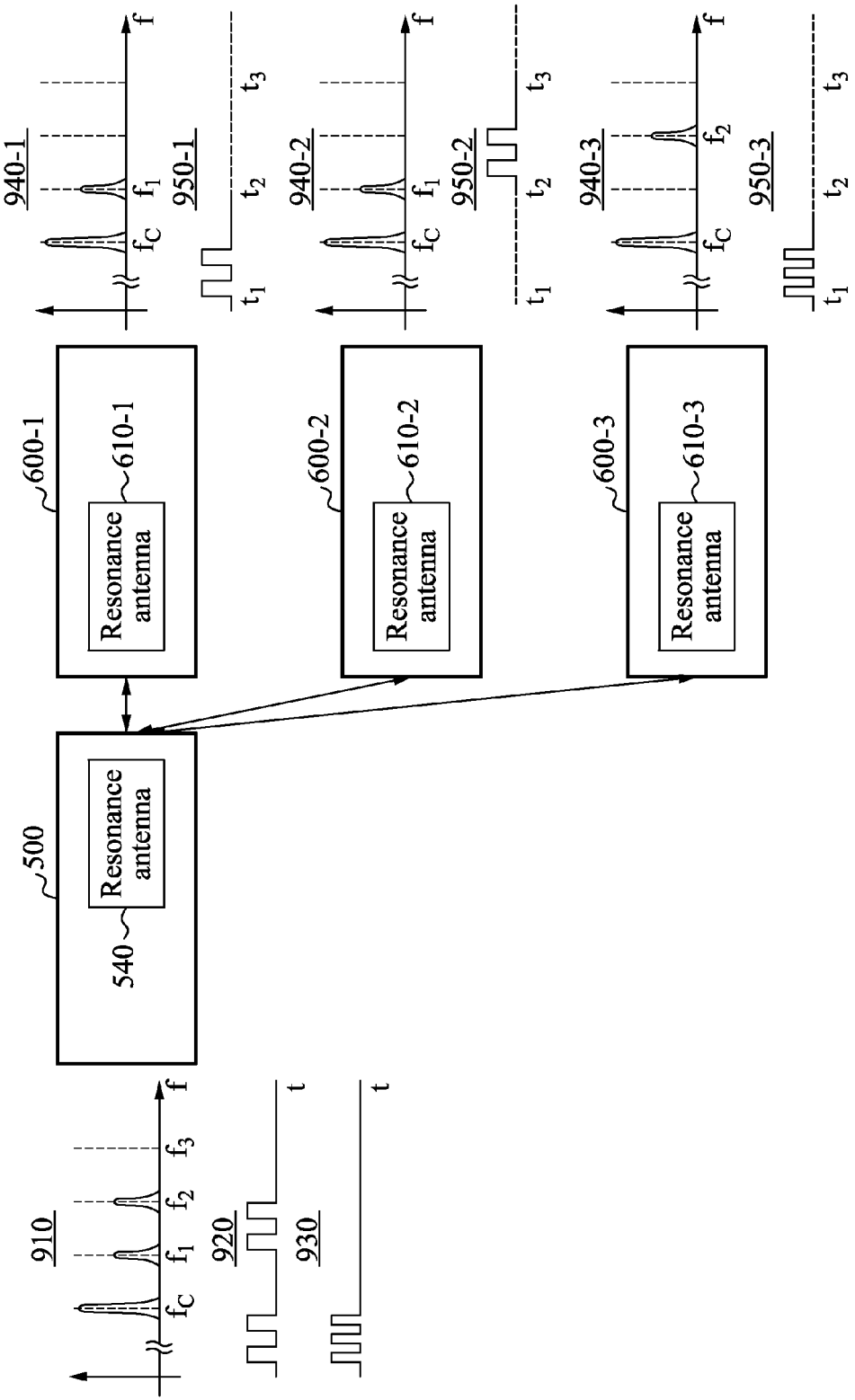
FIG. 9 is a diagram illustrating an example of a wireless channel allocation method using a frequency-time division multiple access (FTDMA) scheme.

FIG. 9 illustrates an example of a wireless channel allocation method using a frequency-time division multiple access (FTDMA) scheme. The source device 500 (e.g., of FIG. 5) performs data communication through wireless power transmission with target devices 600-1, 600-2, and 600-3 (e.g., the target device 600 of FIG. 6). In other words, a single wireless power transmitter communicates with three wireless power receivers.

Graphs 910, 940-1, 940-2, and 940-3 of FIG. 9 represent data communication channels used between the source device 500 and the target devices 600-1 to 600-3 in a frequency (f) domain. Additionally, $f_c$ indicates a frequency of a main carrier, and $f_1$, $f_2$ and $f_3$ indicate frequencies of sub-carriers.

The source device 500 distributes the sub-carriers to the target devices 600-1 to 600-3 using the FTDMA scheme. The FTDMA scheme includes advantages of the above-described TDMA scheme and the FDMA scheme.

Each of graphs 950-1, 950-2, and 950-3 of FIG. 9 represents a signal transmitted from each of the target devices 600-1 to 600-3, respectively, to the source device 500, over time (t). As illustrated in the graphs 940-1, 940-2, 940-3, 950-1, 950-2, and 950-3, a communication channel with the frequency $f_1$ is allocated to the target devices 600-1 and 600-2 in a time division manner. The target device 600-1 transmits data to the source device 500 using the sub-carrier with the frequency $f_1$ during a time slot from time $t_1$ to time $t_2$. The target device 600-2 transmits data to the source device 500 using the sub-carrier with the frequency $f_1$ during a time slot from time $t_2$ to time $t_3$. Additionally, a communication channel with the frequency $f_2$ is allocated to the target device 600-3. The target device 600-1, the target device 600-2, and the target device 600-3 transmit data to the source device 500 simultaneously without colliding with each other.

Graphs 920 and 930 of FIG. 9 represent signals received by the source device 500 over time (t). As illustrated in the graph 920, the source device 500 receives the data from the target devices 600-1 and 600-2 through the sub-carrier with the frequency $f_1$. As illustrated in the graph 930, the source device 500 receives the data from the target device 600-3 through the sub-carrier with the frequency $f_2$.

For example, when the target devices 600-1 and 600-2 communicate with the source device 500 using the communication channel with the frequency $f_1$ in the TDMA scheme, the target device 600-3 may be newly-connected to the source device 500. The controller 530 (e.g., of FIG. 5) may allocate, to the third target device 600-3, the communication channel with the frequency $f_2$ that is not in use. Accordingly, it is possible to prevent data from colliding between the target device 600-3 and the target device 600-1 or 600-2.

In another example, when the target devices 600-1 and 600-3 communicate with the source device 500 using the communication channel with the frequency $f_1$ and a communication channel with the frequency $f_2$, respectively, in the FDMA scheme, the target device 600-2 may be newly-connected to the source device 500. However, the target device 600-2 may not use an available communication channel with the frequency $f_3$, due to, for example, hardware constraints and/or other types of constraints. The controller 530 may allocate the communication channel with the frequency $f_1$ to the target devices 600-1 and 600-2 in the time division manner. The controller 530 may notify the target devices 600-1 and 600-2 of the allocation of the communication channel with the frequency $f_1$ in the time division manner, and of a time slot in which the communication channel with the frequency $f_1$ is available, through the data communication. To prevent data collision, a predetermined time delay between a time slot in which the target device 600-1 may use the communication channel with the frequency $f_1$ and a time slot in which the target device 600-2 may use the communication channel with the frequency $f_1$, may occur.

For efficiency in communication performance, the controller 530 may primarily use the FDMA scheme, and secondarily use the TDMA scheme, to distribute communication channels to target devices. Communication channels allocated using the FDMA scheme, the TDMA scheme, and the FTDMA scheme, as described above, may be used when each of the target devices transmits a data signal to a source device, and when the source device transmits a data signal to the target devices. When the controller 530 increases or reduces a number of the communication channels adaptively, the number of the communication channels allocated to the target devices in the time division manner, or a number of sub-carriers, may be adjusted.

Additionally, the controller 530 may allocate a communication channel (or a sub-carrier) to a predetermined target device, for example, a target device with an ID of a predetermined product. The predetermined target device may require a high reliability. When the communication channel is allocated to the predetermined target device, the controller 530 may change a communication channel (or a sub-carrier) allocated to another target device. In an example in which target devices to perform data communication using pre-allocated communication channels exist, when another target device with a high priority requests the source device 500 to perform wireless power transmission and data communication, the controller 530 may adjust allocation of the communication channels or assignment of time slots with respect to the existing target devices.

When near field communication (NFC) is performed by wireless power transmission between the source device 500 and at least one of the target devices 600-1, 600-2, and 600-3, the controller 530 may allocate at least one frequency channel to added target devices, using different schemes depending on which one of efficiency of wireless power transmission and communication performance is considered to be important. In addition, the communication channel allocation methods may be implemented in an analog manner or a digital manner.

Figure 10:
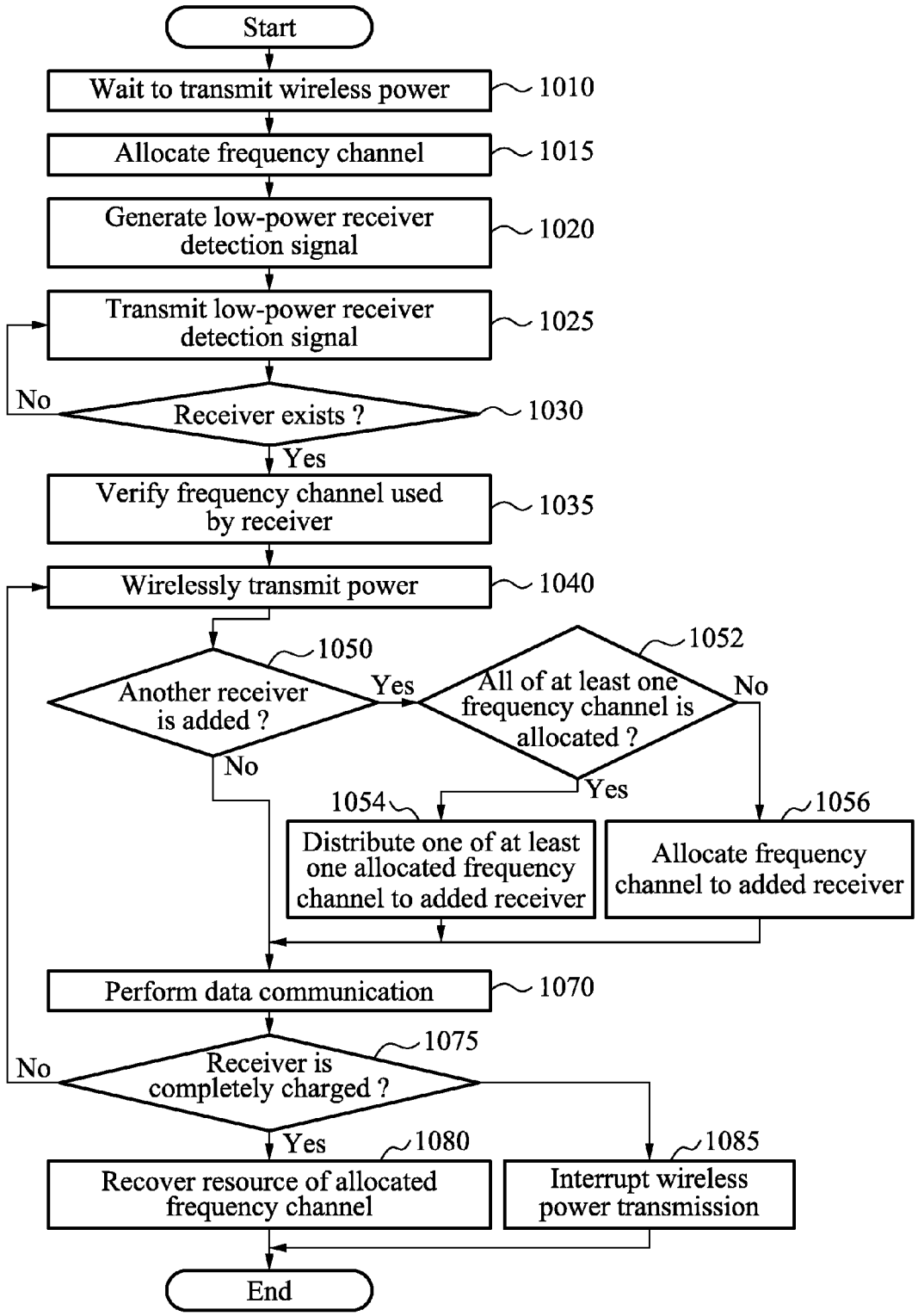
FIG. 10 is a flowchart illustrating an example of a wireless channel allocation method for data communication.

FIG. 10 illustrates an example of a wireless channel allocation method for data communication. Operations 1010 to 1085 of FIG. 10 may be performed by the source device 500 (e.g., of FIG. 5), namely, the controller 530, to allocate at least one communication channel to at least one target device. In this example, the term "receiver" refers to the target device 600 (e.g., of FIG. 6). Additionally, a communication channel refers to a channel with a predetermined sub-carrier frequency. In the following description, the term "communication channel" may be replaced by the term "sub-carrier".

In operation 1010, the controller 530 waits to transmit wireless power. In operation 1015, the controller 530 allocates a predetermined frequency channel among frequency channels that may be used by the source device 500. Each of the frequency channels refers to a channel with a predetermined sub-carrier frequency. In other words, the sub-carrier of FIGS. 5 to 9 may correspond to the frequency channel of FIG. 10.

In operation 1020, the controller 530 generates a low-power receiver detection signal, to detect a receiver enabling wireless power transmission or data communication. The low-power receiver detection signal may be generated by the signal generator 520 (e.g., of FIG. 5), under the control of the controller 530.

In operation 1025, the controller 530 transmits the generated low-power receiver detection signal via the resonance antenna 540 (e.g., of FIG. 5). For example, when the receiver enabling wireless power transmission or data communication exists, the receiver transmits data to the source device 500 in response to the generated low-power receiver detection signal.

In operation 1030, the controller 530 determines whether a receiver exists, based on whether the controller 530 receives a signal (e.g., the data from the receiver) via the resonance antenna 540. The controller 530 detects a receiver based on information generated by the current/voltage sensor 560 (e.g., of FIG. 5) sensing a signal received via the resonance antenna 540.

When the receiver is determined not to exist, operation 1025 is re-performed. The controller 530 may repeatedly perform operations 1025 and 1030 until a receiver is detected.

When the receiver is determined to exist, that is, when the receiver is detected, operation 1035 is performed. In other words, wireless power transmission to the detected receiver is started.

In operation 1035, the controller 530 verifies a frequency channel used by the detected receiver, and allocates the frequency channel among the frequency channels. For example, when the frequency channel allocated in operation 1015 is available to be used by the detected receiver, the controller 530 performs data communication with the detected receiver using the frequency channel. In another example, when the frequency channel allocated in 1015 is not available to be used by the detected receiver, the controller 530 allocates, to the detected receiver, a frequency channel that is available to be used by the detected receiver among the frequency channels.

The frequency channel allocated to the detected receiver is used by the detected receiver to transmit data to the source device 500. The controller 530 may notify the detected receiver of the frequency channel allocated to the detected receiver, through the data transmission from the source device 500 to the detected receiver. The detected receiver performs the data communication with the source device 500 using the frequency channel allocated to the detected receiver.

In operation 1040, the controller 530 wirelessly transmits power to the detected receiver via the resonance antenna 540. That is, the controller 530 controls the PA 524 (e.g., of FIG. 5), and generates the same amount of a power as an amount of a power required by the detected receiver. The generated power is wirelessly transmitted to the detected receiver via the resonance antenna 540.

In operation 1050, 1052, 1054, and 1056, the controller 530 detects an added receiver while the power is wirelessly transmitted to the detected receiver. In operation 1050, the controller 530 determines whether another receiver is added, based on whether the controller 530 receives a signal via the resonance antenna 540. The controller 530 detects the added receiver, based on the information generated by the current/voltage sensor 560 sensing the signal received via the resonance antenna 540. When the other receiver is added, operation 1052 is performed. Otherwise, operation 1070 is performed.

In operation 1052, the controller 530 determines whether all of the at least one frequency channel is allocated. For example, when a number of receivers is greater than a number of frequency channels available to be used by the source device 500, all of the frequency channels are respectively allocated to the receivers.

When all of the at least one frequency channel is determined to be allocated, operation 1054 is performed. Additionally, when a non-allocated frequency channel exists, but is not available to be used by the added receiver, operation 1054 is performed. The detected receiver and the added receiver share the at least one frequency channel already allocated.

In operation 1054, the controller 530 distributes, to the added receiver, one of the at least one allocated frequency channel in a time axis. The distributing of the frequency channel is based on time-division of the frequency channel. A predetermined frequency channel may be selected from among the frequency channels, and may be distributed to the added receiver.

Additionally, the controller 530 may notify the receiver to which the frequency channel is allocated previously, of the distribution of the frequency channel. The controller 530 may transmit data associated with the distributing, to the detected receiver and the added receiver via the resonance antenna 540.

When a frequency channel among the frequency channels is not allocated, operation 1056 is performed. In operation 1056, the controller 530 allocates the non-allocated frequency channel to the added receiver.

In operation 1070, the controller 530 performs data communication with receivers, for example, the detected receiver and the added receiver, through the frequency channels respectively allocated to the receivers. In operation 1075, the controller 530 determines whether a receiver is completely charged based on the data communication with the receiver. When the receiver is determined to be completely charged, operations 1080 and 1085 are performed. Conversely, when the receiver is determined not to be completely charged, operation 1040 is re-performed, that is, the source device 500 continues to wirelessly transmit power to the receiver.

In operation 1080, the controller 530 recovers a resource of a frequency channel allocated to the completely-charged receiver. The resource of the frequency channel may refer to the frequency channel itself, or may refer to a time-divided frequency channel. The recovered resource may be re-used for a newly-added receiver.

In 1085, the controller 530 interrupts the wireless power transmission to the completely-charged receiver. For example, when a receiver that is not completely-charged remains, the controller 530 may interrupt the wireless power transmission corresponding to a power required by the completely-charged receiver. The examples described herein with reference to FIGS. 1 to 9 may be applied to the example illustrated in FIG. 10.

Figure 11:
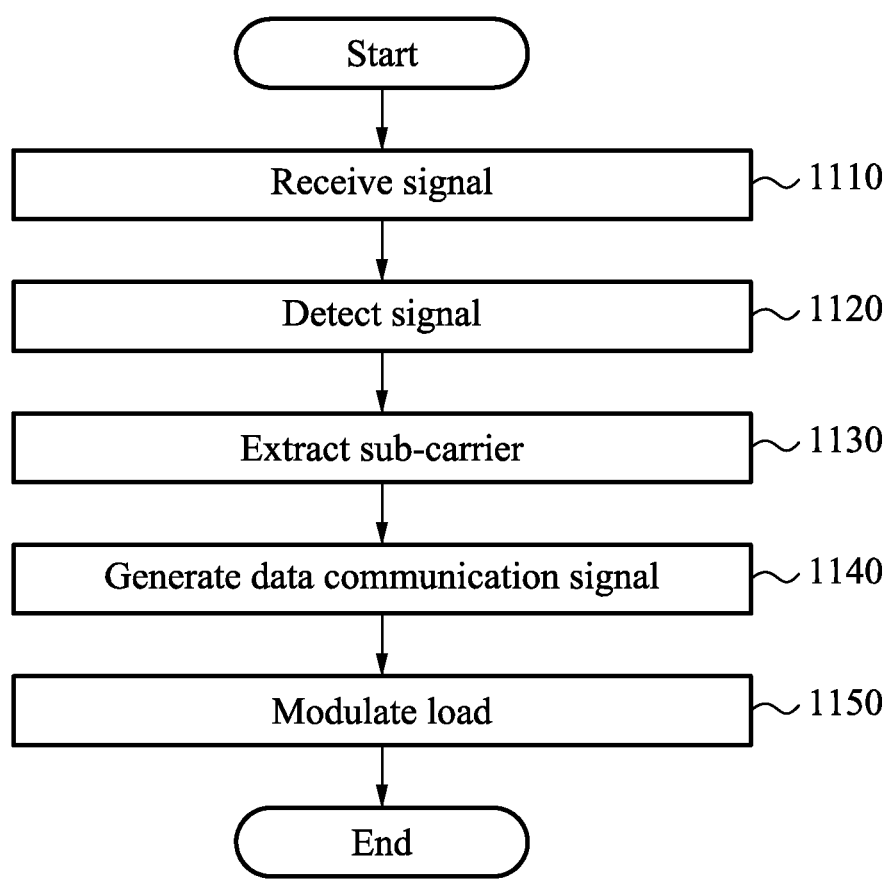
FIG. 11 is a flowchart illustrating an example of a data communication method of a target device.

FIG. 11 illustrates an example of a data communication method of a target device. Operations 1110 to 1150 of FIG. 11 may be performed by the target device 600 (e.g., of FIG. 6) to perform data communication with the source device 500 (e.g., of FIG. 5).

In operation 1110, the resonance antenna 610 (e.g., of FIG. 6) of the target device 600 receives a signal from the resonance antenna 540 (e.g., of FIG. 5) of the source device 500. For example, the resonance antenna 610 may receive a power/data signal may be received from the source device 500. In the example of FIG. 11, the power/data signal refers to a received signal.

In operation 1120, the detector 650 (e.g., of FIG. 6) of the target device 600 detects a signal, namely a data signal. To do this, the detector 650 removes a main carrier from the received signal to demodulate the received signal.

In operation 1130, the band-pass filter unit 660 (e.g., of FIG. 6) of the target device 600 extracts a sub-carrier from the demodulated signal. At least one received sub-carrier is extracted from the demodulated signal, through band-pass filtering.

In operation 1140, the controller 668 (e.g., of FIG. 6) of the target device 600 generates a data communication signal. To do this, the controller 668 detects an envelope of the extracted sub-carrier. The controller 668 recognizes data received from the source device 500, based on logical values '1' and '0' in the detected envelope. Based on a predetermined protocol and/or the recognized data, the controller 668 generates data that is to be transmitted to the source device 500. The generated data may include the data transmitted from the source device 500 to the target device 600. The controller 668 generates the data communication signal including the generated data.

In operation 1150, the load modulator 670 (e.g., of FIG. 6) of the target device 600 modulates a load of the target device 600. To do this, the load modulator 670 modulates a signal transmitted from the resonance antenna 610 to the source device 500, under the control of the controller 668 using the data communication signal, to transmit the generated data to the source device 500. The load modulator 670 changes the load of the target device 600 to modulate the transmitted signal. Additionally, the transmitted signal includes at least one sub-carrier. The data is transmitted to the source device 500 using the sub-carrier allocated to the target device 600 among sub-carriers. The examples described herein with reference to FIGS. 1 to 10 may be applied to the example illustrated in FIG. 11.

Figure 12:
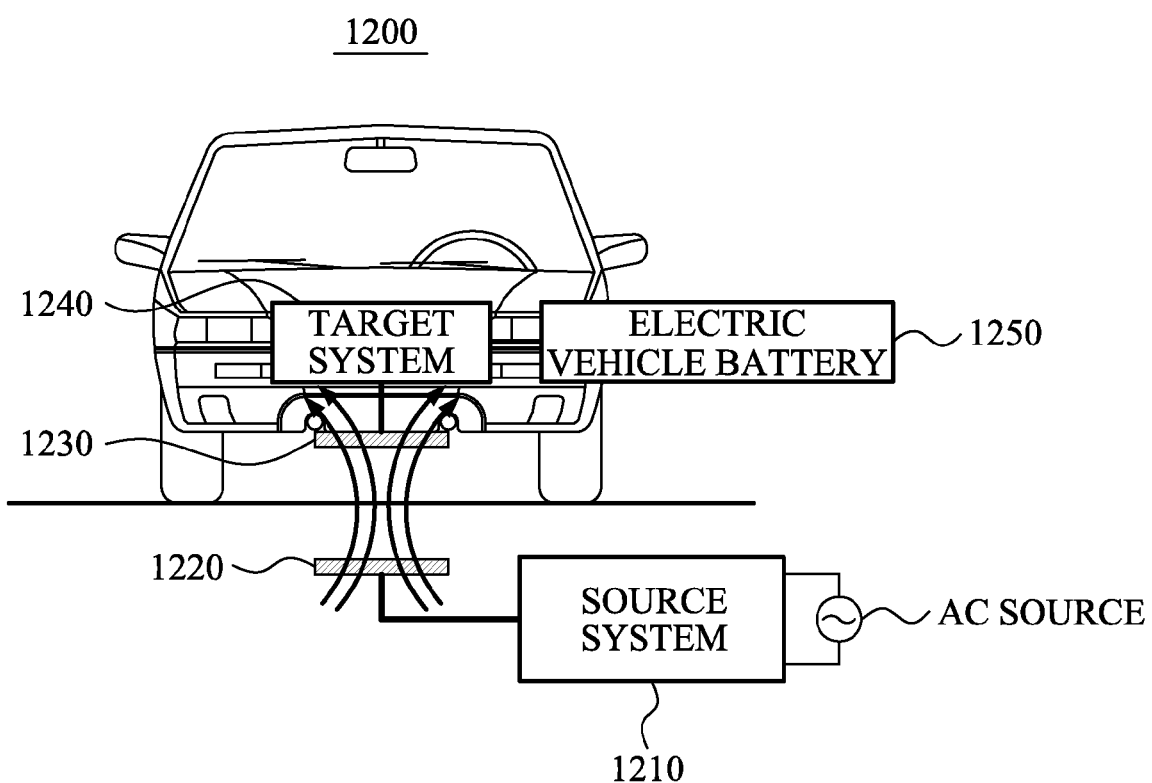
FIG. 12 is a diagram illustrating an example of an electric vehicle charging system.

FIG. 12 illustrates an example of an electric vehicle charging system. Referring to FIG. 12, an electric vehicle charging system 1200 includes a source system 1210, a source resonator 1220, a target resonator 1230, a target system 1240, and an electric vehicle battery 1250.

The source system 1210 and the source resonator 1220 in the electric vehicle charging system 1200 may function as a source. Additionally, the target resonator 1230 and the target system 1240 in the electric vehicle charging system 1200 may function as a target.

The source system 1210 may include an alternating current-to-direct current (AC/DC) converter, a power detector, a power converter, and a control/communication unit. The target system 1240 may include a rectification unit, a DC-to-DC (DC/DC) converter, a switch unit, a charging unit, and a control/communication unit. The electric vehicle battery 1250 may be charged by the target system 1240. The electric vehicle charging system 1200 may use a resonant frequency in a band of a few kilohertz (KHz) to tens of MHz.

The source system 1210 may generate power, based on a type of charging vehicle, a capacity of a battery, and a charging state of a battery, and may supply the generated power to the target system 1240. The source system 1210 may control the source resonator 1220 and the target resonator 1230 to be aligned. For example, when the source resonator 1220 and the target resonator 1230 are not aligned, the controller of the source system 1210 may transmit a message to the target system 1240, and may control alignment between the source resonator 1220 and the target resonator 1230.

For example, when the target resonator 1230 is not located in a position enabling maximum magnetic resonance, the source resonator 1220 and the target resonator 1230 may not be aligned. When a vehicle does not stop accurately, the source system 1210 may induce a position of the vehicle to be adjusted, and may control the source resonator 1220 and the target resonator 1230 to be aligned. The source system 1210 and the target system 1240 may transmit or receive an ID of a vehicle, or may exchange various messages, through communication.

The descriptions of FIGS. 1 through 11 may be applied to the electric vehicle charging system 1200. However, the electric vehicle charging system 1200 may use a resonant frequency in a band of a few KHz to tens of MHz, and may transmit power that is equal to or higher than tens of watts to charge the electric vehicle battery 1250.

Figure 13:
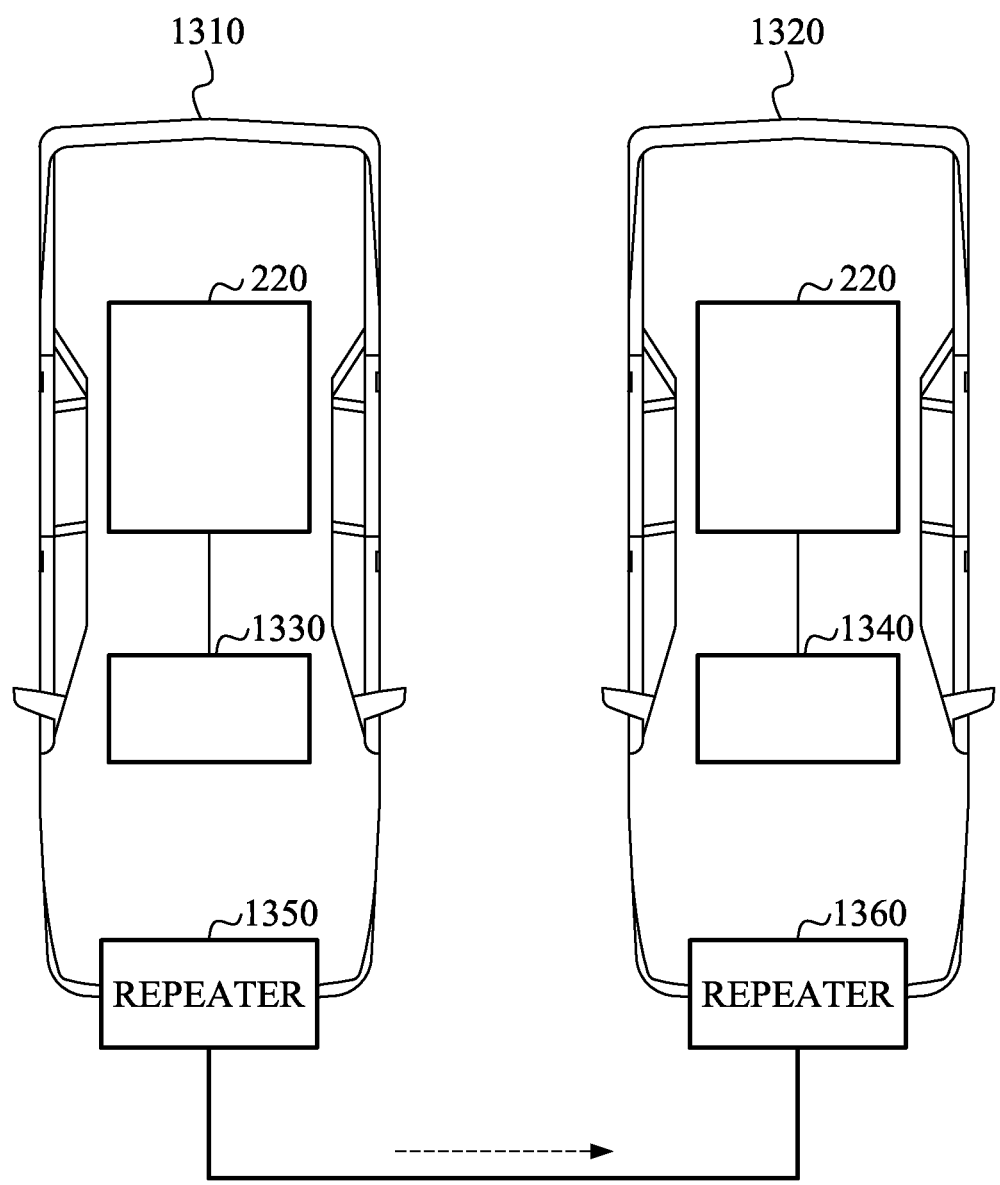
FIG. 13 is a diagram illustrating an example of a wireless power transmission method of an electric vehicle.

FIG. 13 illustrates an example of a wireless power transmission method of an electric vehicle. In FIG. 13, wireless power transmission may be performed between electric vehicles.

A first electric vehicle 1310 may be operated in a power transmission mode, and a second electric vehicle 1320 may be operated in a power reception mode. The first electric vehicle 1310 may further include a source resonator 1330 operated in the power transmission mode, and the second electric vehicle 1320 may further include a target resonator 1340 operated in the power reception mode.

Additionally, the wireless power transmission between the first electric vehicle 1310 and the second electric vehicle 1320 may be performed via repeaters 1350 and 1360. The first electric vehicle 1310 may perform the wireless power transmission using an external power source, or using power used to charge a battery.

The units described herein may be implemented using hardware components and software components. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. For example, the software and data may be stored by one or more computer readable recording mediums. The computer readable recording medium may include any data storage device that can store data which can be thereafter read by a computer system or processing device. Examples of the non-transitory computer readable recording medium include read-only memory (ROM), random-access memory (RAM), CD-ROMs, magnetic tapes, floppy disks, optical data storage devices. Also, functional programs, codes, and code segments to accomplish the examples disclosed herein can be easily construed by programmers skilled in the art to which the examples pertain based on and using the flow diagrams and block diagrams of the figures and their corresponding descriptions as provided herein.

As a non-exhaustive illustration only, a device described herein may refer to mobile devices such as a cellular phone, a personal digital assistant (PDA), a digital camera, a portable game console, and an MP3 player, a portable/personal multimedia player (PMP), a handheld e-book, a portable laptop PC, a global positioning system (GPS) navigation, a tablet, a sensor, and devices such as a desktop PC, a high definition television (HDTV), an optical disc player, a setup box, a home appliance, and the like that are capable of wireless communication or network communication consistent with that which is disclosed herein.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A wireless power transmitter comprising:
   a resonance antenna configured to
      wirelessly transmit a power to a wireless power receiver, and
      receive a signal from the wireless power receiver, the signal comprising a sub-carrier; and
   a controller configured to
      receive the signal from the resonance antenna,
      receive data from the wireless power receiver based on the sub-carrier,
   wherein the controller is further configured to:
      increase or reduce a number of sub-carriers allocated to the wireless power receiver based on an environment of the wireless power transmitter and the wireless power receiver; and
      adjust allocation of the sub-carrier to the wireless power receiver based on the number of the sub-carriers.

2. The wireless power transmitter of claim 1, wherein the data comprises in-band communication data that establishes in-band communication between the wireless power transmitter and the wireless power receiver.

3. The wireless power transmitter of claim 1, wherein the controller is further configured to:
   detect an envelope of the sub-carrier, the envelope comprising logical values '1' and '0'; and
   receive the data from the wireless power receiver based on the logical values '1' and '0'.

4. The wireless power transmitter of claim 1, wherein the controller is further configured to:
   detect another wireless power receiver; and
   allocate, to the other wireless power receiver, a non-allocated sub-carrier among sub-carriers.

5. The wireless power transmitter of claim 1, wherein the controller is further configured to:
   detect another wireless power receiver; and
   allocate, to the other wireless power receiver, an allocated sub-carrier among sub-carriers, and a time slot.

6. The wireless power transmitter of claim 1, wherein:
   the controller is further configured to transmit data to the resonance antenna; and
   the resonance antenna is further configured to transmit the data to the wireless power receiver using the sub-carrier.

7. The wireless power transmitter of claim 1, further comprising:
   a detector configured to
      receive the signal from the resonance antenna, and
      remove a main carrier from the signal to demodulate the signal; and
   a band-pass filter unit configured to extract the sub-carrier from the demodulated signal.

8. The wireless power transmitter of claim 7, wherein the band-pass filter unit comprises a band-pass filter configured to extract the sub-carrier from the demodulated signal through filtering.

9. The wireless power transmitter of claim 1, wherein:
   the sub-carrier comprises a time slot; and
   the controller is further configured to receive the data from the wireless power receiver based on the sub-carrier and the time slot.

10. The wireless power transmitter of claim 1, wherein the controller is configured to
    calculate power transmission efficiencies for resonance frequencies adjusted by a preset scheme, determine a resonance frequency with a best power transmission efficiency, and
    adjust a reference resonance frequency to the resonance frequency with the best power transmission efficiency.

11. The wireless power transmitter of claim 1, wherein the controller is configured to adjust a frequency of the sub-carrier based on a Q-factor of the resonance antenna.

12. A wireless power receiver comprising:
    a resonance antenna configured to wirelessly receive a power and data (power/data) signal from a wireless power transmitter;
    a controller configured to generate a communication signal comprising data to be transmitted to the wireless power transmitter; and
    a load modulator configured to
       receive the communication signal from the controller, and
       modulate a load of the wireless power receiver to generate an output signal based on the communication signal, the output signal comprising a sub-carrier allocated to the wireless power receiver,
    wherein the resonance antenna is further configured to
       receive the output signal from the load modulator, and
       transmit the output signal to the wireless power transmitter using the sub-carrier,
    wherein the wireless power receiver further comprises
       a detector configured to receive the power/data signal from the resonance antenna and remove a main carrier from the power/data signal to demodulate the power/data signal, and
       a band-pass filter unit configured to extract another sub-carrier allocated to the wireless power receiver from the demodulated power/data signal; and the controller is further configured to
    detect an envelope of the other sub-carrier, the envelope comprising logical values '1' and '0', and
    recognize data from the wireless power transmitter based on the logical values '1' and '0'.

13. The wireless power receiver of claim 12, wherein the band-pass filter unit comprises a band-pass filter, configured to extract the other sub-carrier.

14. The wireless power receiver of claim 12, wherein:
    the sub-carrier comprises a time slot allocated to the wireless power receiver; and
    the resonance antenna is further configured to transmit the output signal to the wireless power transmitter using the sub-carrier and the time slot.

15. A data communication method comprising:
    detecting a wireless power receiver;
    allocating, to the wireless power receiver, a frequency channel among frequency channels;
    transmitting a power to the wireless power receiver; and
    performing data communication with the wireless power receiver using the frequency channel;
    determining whether the wireless power receiver is completely charged based on the data communication;
    recovering the frequency channel in response to the wireless power receiver being completely charged; and
    interrupting the transmitting of the power to the wireless power receiver in response to the wireless power receiver being completely charged.

16. The data communication method of claim 15, further comprising:
    detecting another wireless power receiver;
    determining whether all of the frequency channels are allocated; and
    allocating, to the other wireless power receiver, a non-allocated frequency channel among the frequency channels in response to all of the frequency channels not being allocated.

17. The data communication method of claim 16, further comprising:
    distributing, to the other wireless power receiver, an allocated frequency channel among the frequency channels based on a time-division of the frequency channel in response to all of the frequency channels being allocated.

18. A non-transitory computer-readable storage medium storing a program comprising instructions to cause a computer to implement the method of claim 15.

19. A data transmission method comprising:
    receive a power and data (power/data) signal from a wireless power transmitter;
    removing a main carrier from the power/data signal to demodulate the power/data signal;
    extracting another sub-carrier allocated to the wireless power receiver from the demodulated power/data signal;

detecting an envelope of the other sub-carrier, the envelope comprising logical values '1' and '0';
recognizing data from the wireless power transmitter based on the logical values '1' and '0';
generating a communication signal comprising data to be transmitted to the wireless power transmitter; and
generating an output signal based on the communication signal, the output signal comprising a sub-carrier allocated to a wireless power receiver; and
transmitting the output signal to the wireless power transmitter using the sub-carrier.

* * * * *